(12) United States Patent
Holmes et al.

(10) Patent No.: US 9,429,762 B2
(45) Date of Patent: Aug. 30, 2016

(54) SECURITY DEVICE

(75) Inventors: Brian William Holmes, Fleet (GB); Lawrence George Commander, Tilehurst (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 401 days.

(21) Appl. No.: 13/500,495

(22) PCT Filed: Oct. 27, 2010

(86) PCT No.: PCT/GB2010/001993
§ 371 (c)(1), (2), (4) Date: Jun. 26, 2012

(87) PCT Pub. No.: WO2011/051668
PCT Pub. Date: May 5, 2011

(65) Prior Publication Data
US 2012/0268598 A1 Oct. 25, 2012

Related U.S. Application Data

(60) Provisional application No. 61/272,774, filed on Oct. 30, 2009.

(30) Foreign Application Priority Data

Oct. 30, 2009 (GB) .................................. 0919112.3

(51) Int. Cl.
*G02B 27/22* (2006.01)
*B42D 25/29* (2014.01)

(52) U.S. Cl.
CPC ............ *G02B 27/2214* (2013.01); *B42D 25/29* (2014.10); *B42D 2035/24* (2013.01); *B42D 2035/44* (2013.01)

(58) Field of Classification Search
CPC .. B42D 15/00; B42D 25/29; B42D 2035/34; B42D 25/324; H04N 1/40; H04N 1/32251; H04N 1/32256; B41M 3/14; G06T 1/0021; G06T 2201/0051; B32B 3/00; B32B 7/00; B32B 15/00; D21H 21/44; G02B 3/0056; G02B 3/0062

USPC ........................................................ 348/143
See application file for complete search history.

(56) References Cited

U.S. PATENT DOCUMENTS 4,186,943 A 2/1980 Lee
4,402,150 A 9/1983 Sullivan
(Continued)

FOREIGN PATENT DOCUMENTS

AU 764842 B2 9/2003
CN 101193759 A 6/2008
(Continued)

OTHER PUBLICATIONS

Mar. 2, 2011 International Search Report issued in International Application No. PCT/GB2010/001993 (not attached).
(Continued)

*Primary Examiner* — Jay Patel
*Assistant Examiner* — Frank Huang
(74) *Attorney, Agent, or Firm* — Oliff PLC

(57) ABSTRACT

A lenticular device includes an array of lenticular focusing elements located over a corresponding array of pairs of image strips such that, in a first viewing direction, a first image strip from each pair is viewed by respective ones of the lenticular focusing elements and, in a second viewing direction, different from the first, a second image strip from each pair is viewed by respective ones of the lenticular focusing elements, One of each pair of image strips has portions defining a first image in a first color and a second image in a second color respectively, and the other of each pair of image strips has portions defining the first image in the second color and the second image in the first color respectively, whereby on tilting the device, a color switch is observed between the first and second images.

48 Claims, 37 Drawing Sheets

(56) References Cited

U.S. PATENT DOCUMENTS

| | | | |
|---|---|---|---|
| 4,417,784 A | 11/1983 | Knop et al. | |
| 4,652,015 A | 3/1987 | Crane | |
| 4,765,656 A | 8/1988 | Becker et al. | |
| 4,856,857 A | 8/1989 | Takeuchi et al. | |
| 4,892,336 A | 1/1990 | Kaule et al. | |
| 5,301,981 A | 4/1994 | Nesis | |
| 6,428,051 B1 | 8/2002 | Herrmann et al. | |
| 6,508,489 B2 | 1/2003 | Herrmann et al. | |
| 8,778,481 B2* | 7/2014 | Kaule et al. | 428/195.1 |
| 2002/0030360 A1 | 3/2002 | Herrmann et al. | |
| 2005/0029800 A1 | 2/2005 | Disano et al. | |
| 2005/0264651 A1* | 12/2005 | Saishu et al. | 348/51 |
| 2006/0238545 A1* | 10/2006 | Bakin et al. | 345/613 |
| 2009/0214105 A1 | 8/2009 | van den Berg | |
| 2013/0155519 A1* | 6/2013 | Jolic | 359/619 |

FOREIGN PATENT DOCUMENTS

| | | |
|---|---|---|
| EP | 0 723 501 B1 | 7/1997 |
| EP | 0 724 519 B1 | 7/1997 |
| EP | 1 141 480 B1 | 2/2004 |
| EP | 1 398 174 A1 | 3/2004 |
| JP | 2002-365746 | 12/2002 |
| JP | U-3120531 | 4/2006 |
| JP | 2008-049648 | 3/2008 |
| WO | WO 83/00659 A1 | 3/1983 |
| WO | WO 94/27254 A1 | 11/1994 |
| WO | WO 99/36257 A1 | 7/1999 |
| WO | WO 03/052680 A1 | 6/2003 |
| WO | WO 03/054297 A2 | 7/2003 |
| WO | WO 03/091952 A2 | 11/2003 |
| WO | WO 03/091953 A2 | 11/2003 |
| WO | WO 2005/052650 A2 | 6/2005 |
| WO | WO 2005/106601 A2 | 11/2005 |
| WO | WO 2005/115119 A2 | 12/2005 |
| WO | WO 2006/110038 A2 | 10/2006 |

OTHER PUBLICATIONS

Mar. 2, 2011 Written Opinion of the International Searching Authority issued in International Application No. PCT/GB2010/001993.
Office Action issued in Chinese Application No. 2010800495428 issued Mar. 4, 2014 (with translation).
Declaration of Jonathan Moon from Opposition in Australian Patent Application No. 2010311162.
Declaration of Philip Peter Gottfried from Opposition in Australian Patent Application No. 2010311162, Part 1.
Declaration of Philip Peter Gottfried from Opposition in Australian Patent Application No. 2010311162, Part 2.
Declaration of Bruce Alfred Hardwick from Opposition in Australian Patent Application No. 2010311162.
Declaration of Jonathan Moon from Opposition in Australian Patent Application No. 2010311162, Part 1.
Declaration of Jonathan Moon from Opposition in Australian Patent Application No. 2010311162, Part 2.
Declaration of Jonathan Moon from Opposition in Australian Patent Application No. 2010311162, Part 3.

* cited by examiner

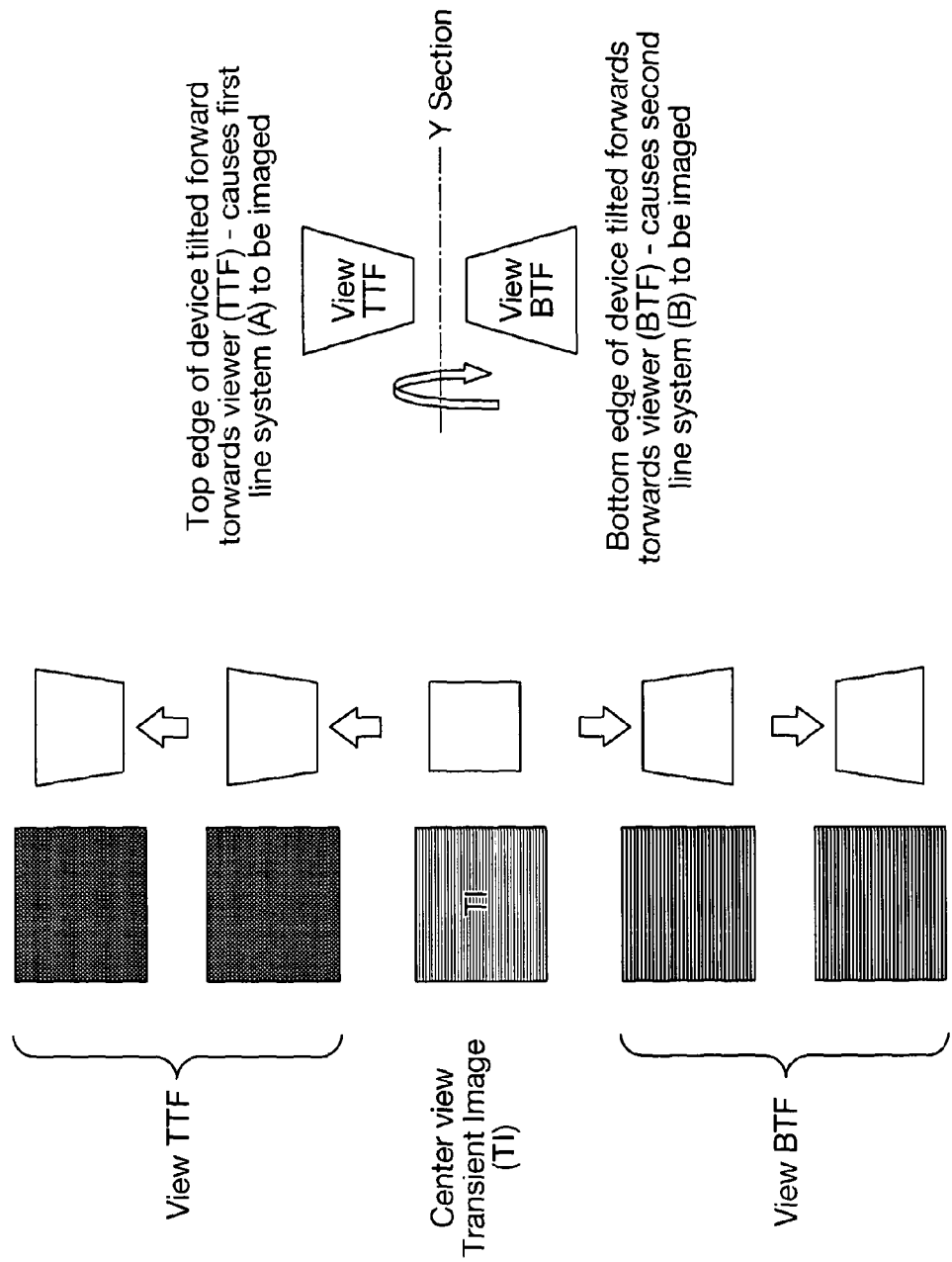

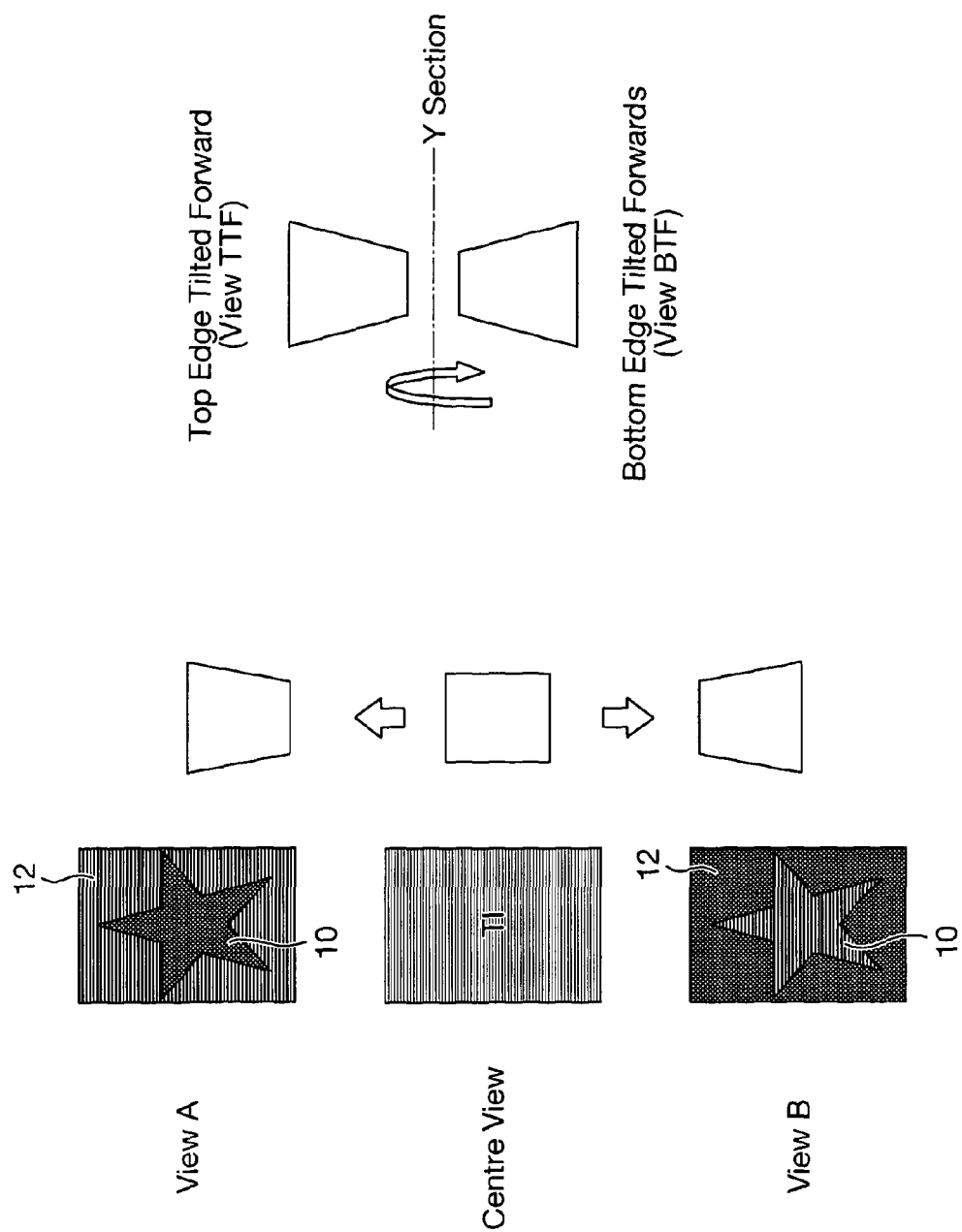

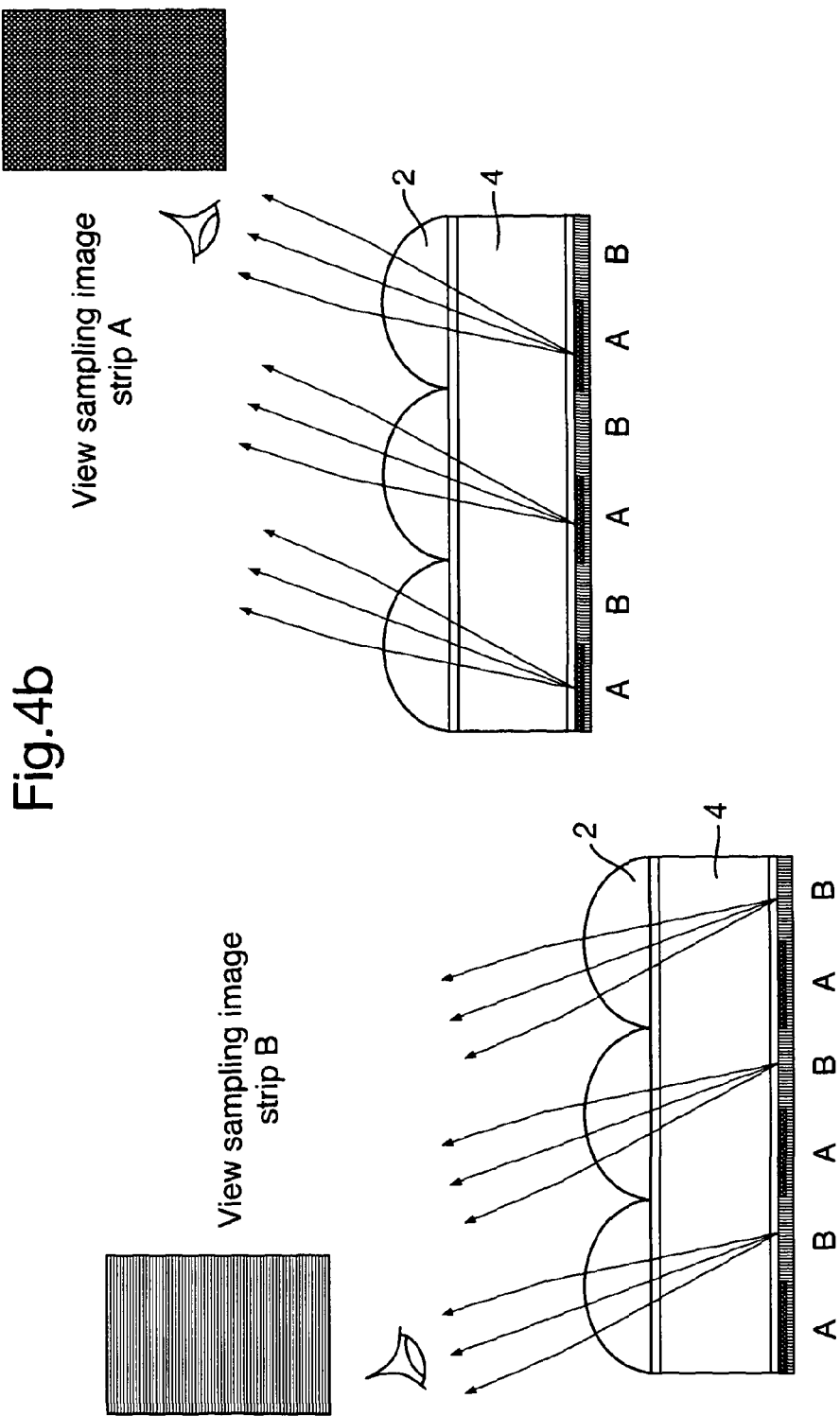

At the boundary between the first
region (defined by star) and second
region (defined by surrounding background)
the first and second line systems are
shifted by half a grid repeat

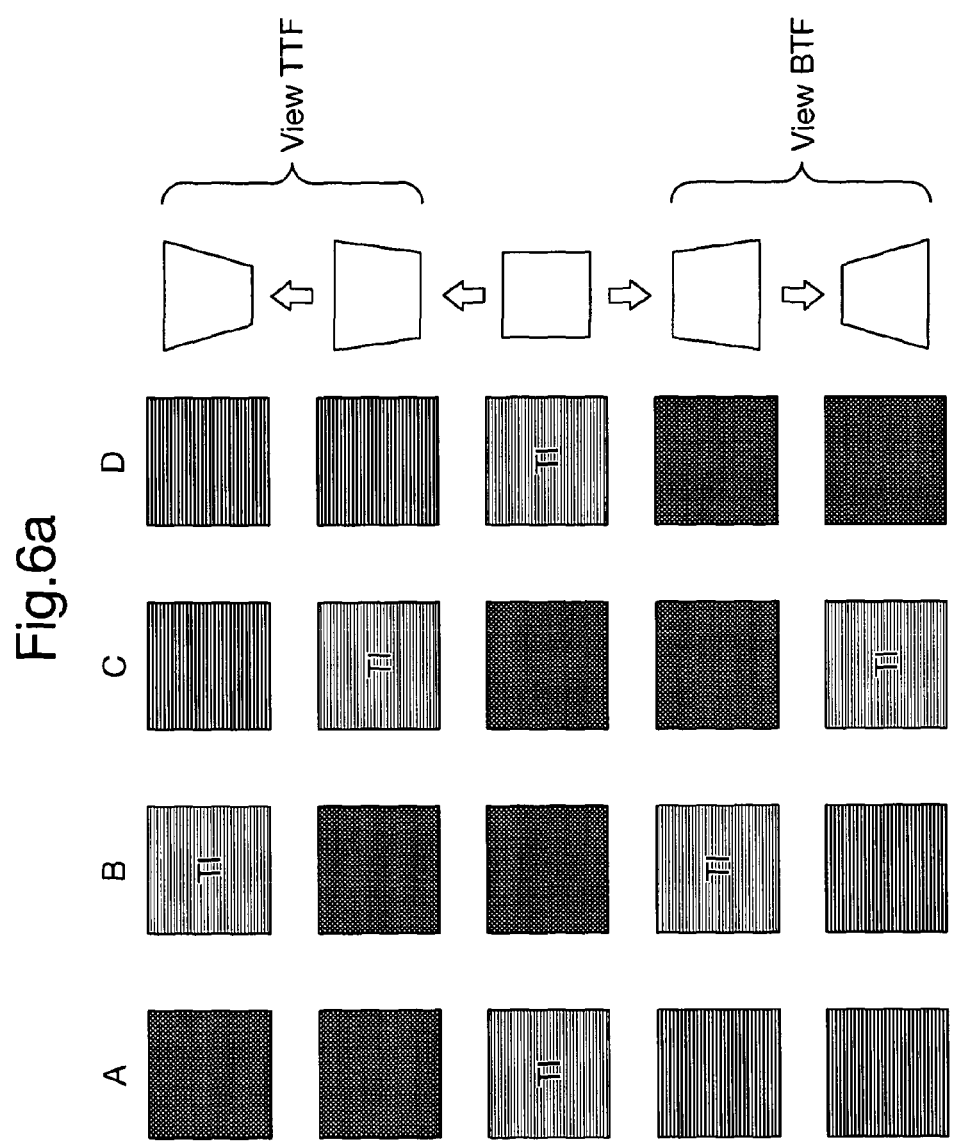

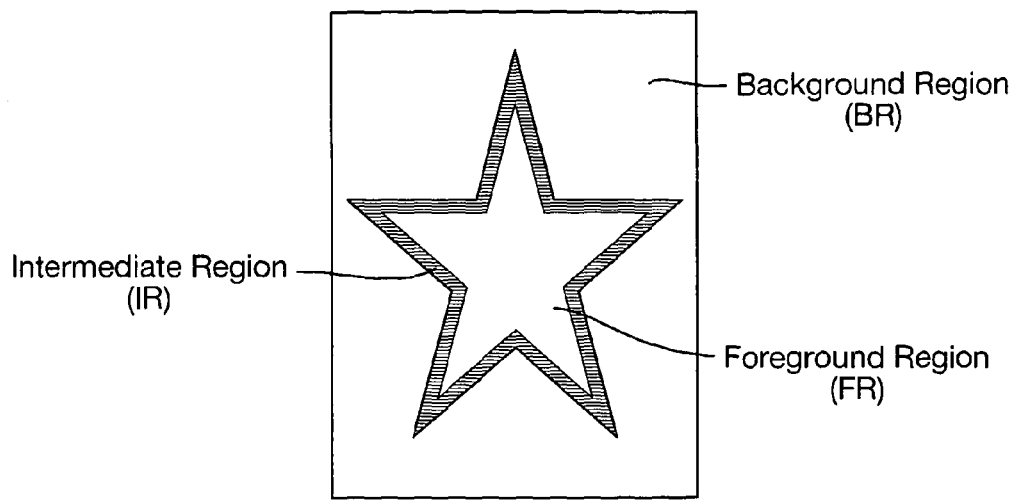
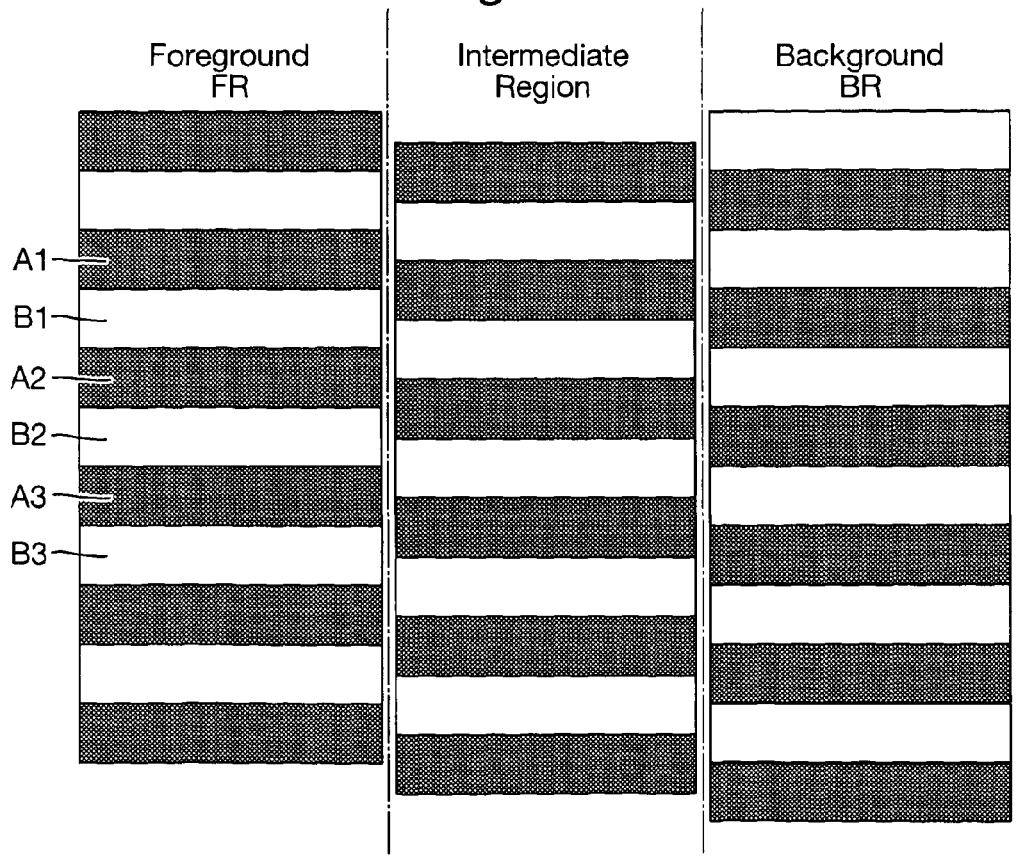

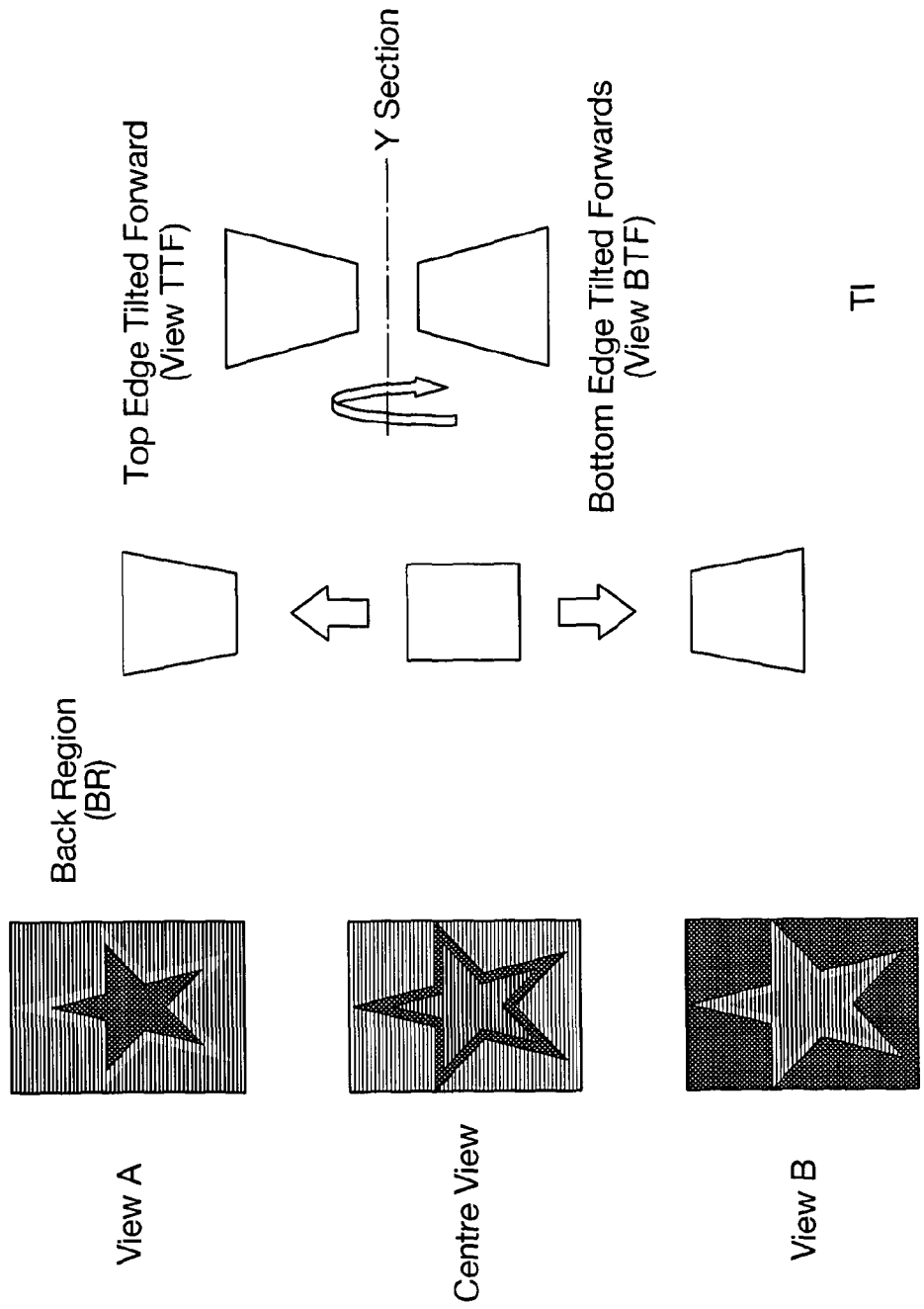

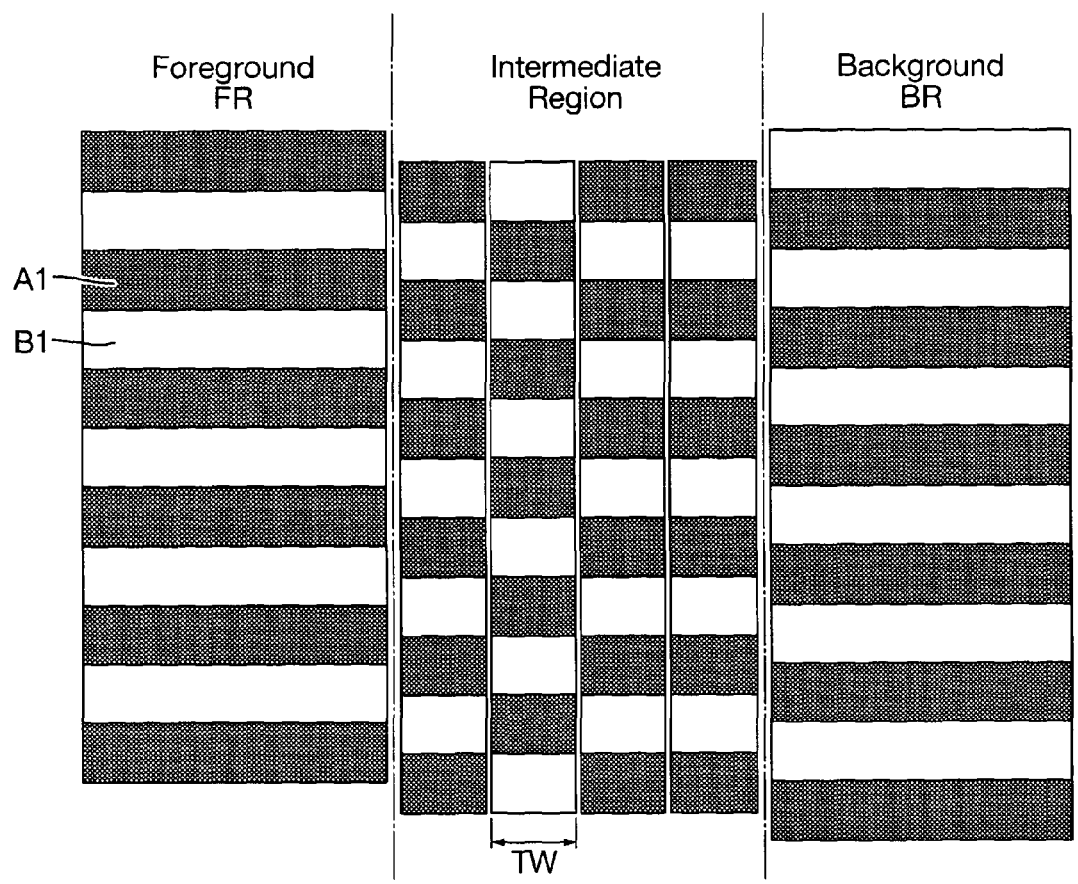

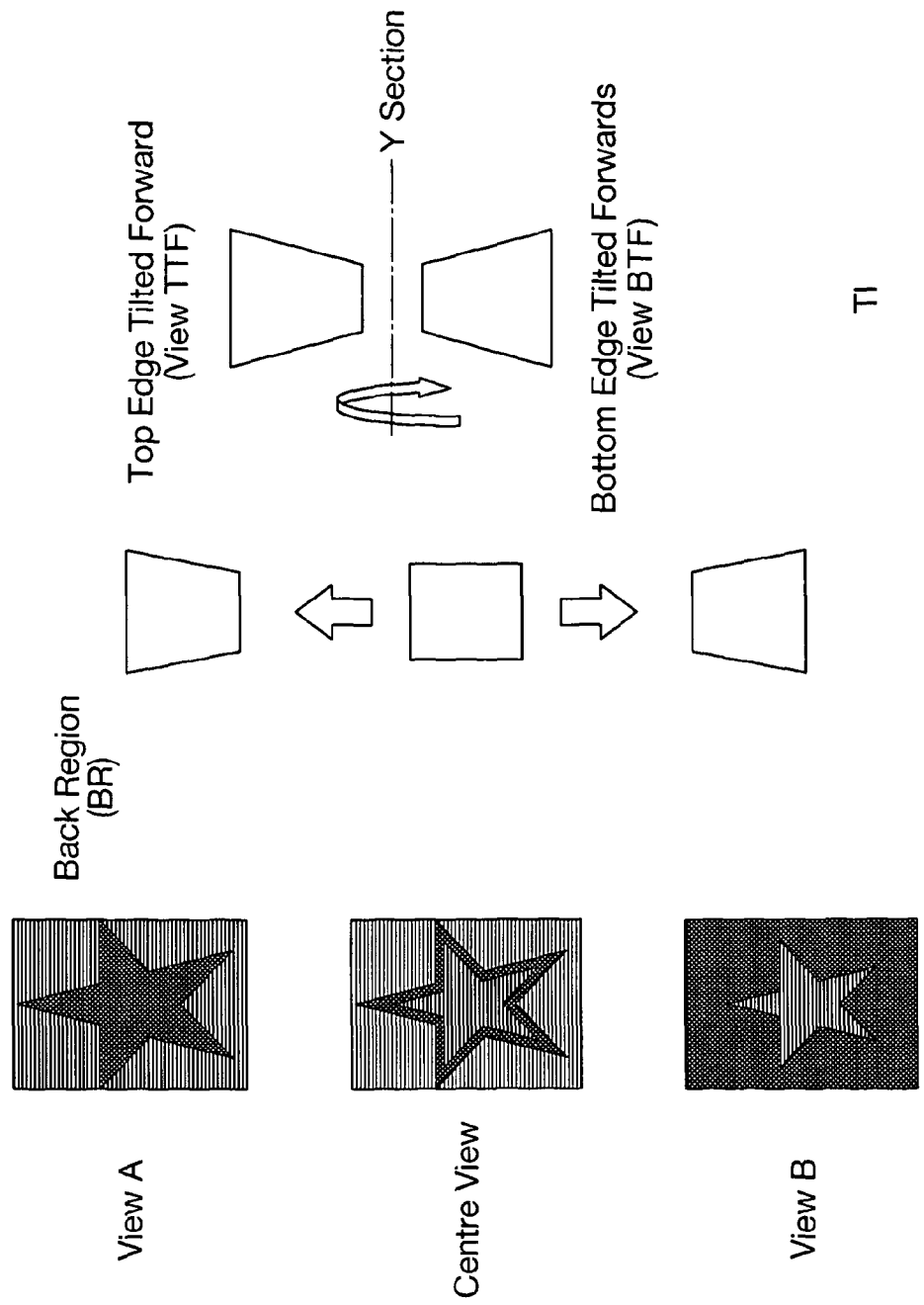

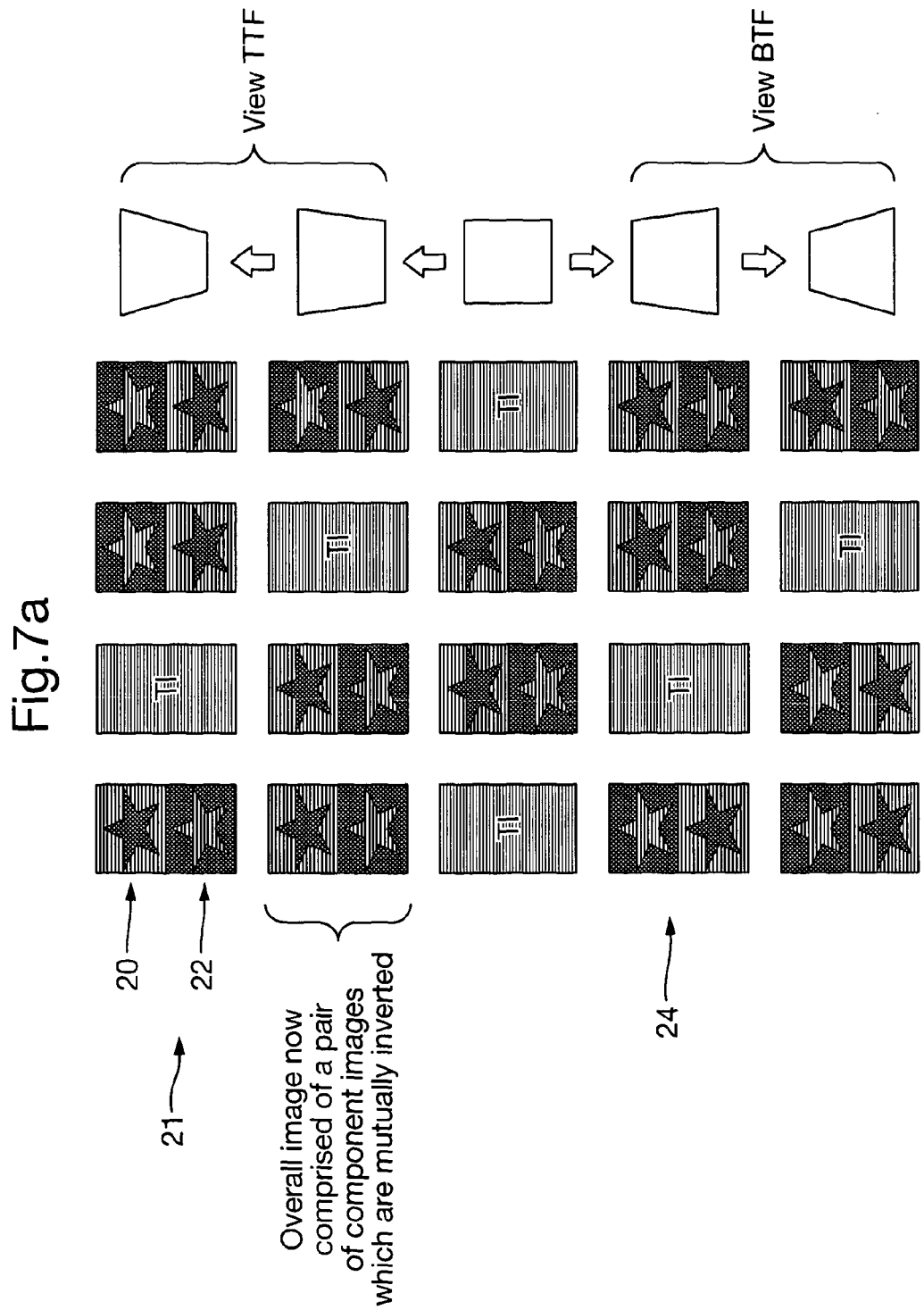

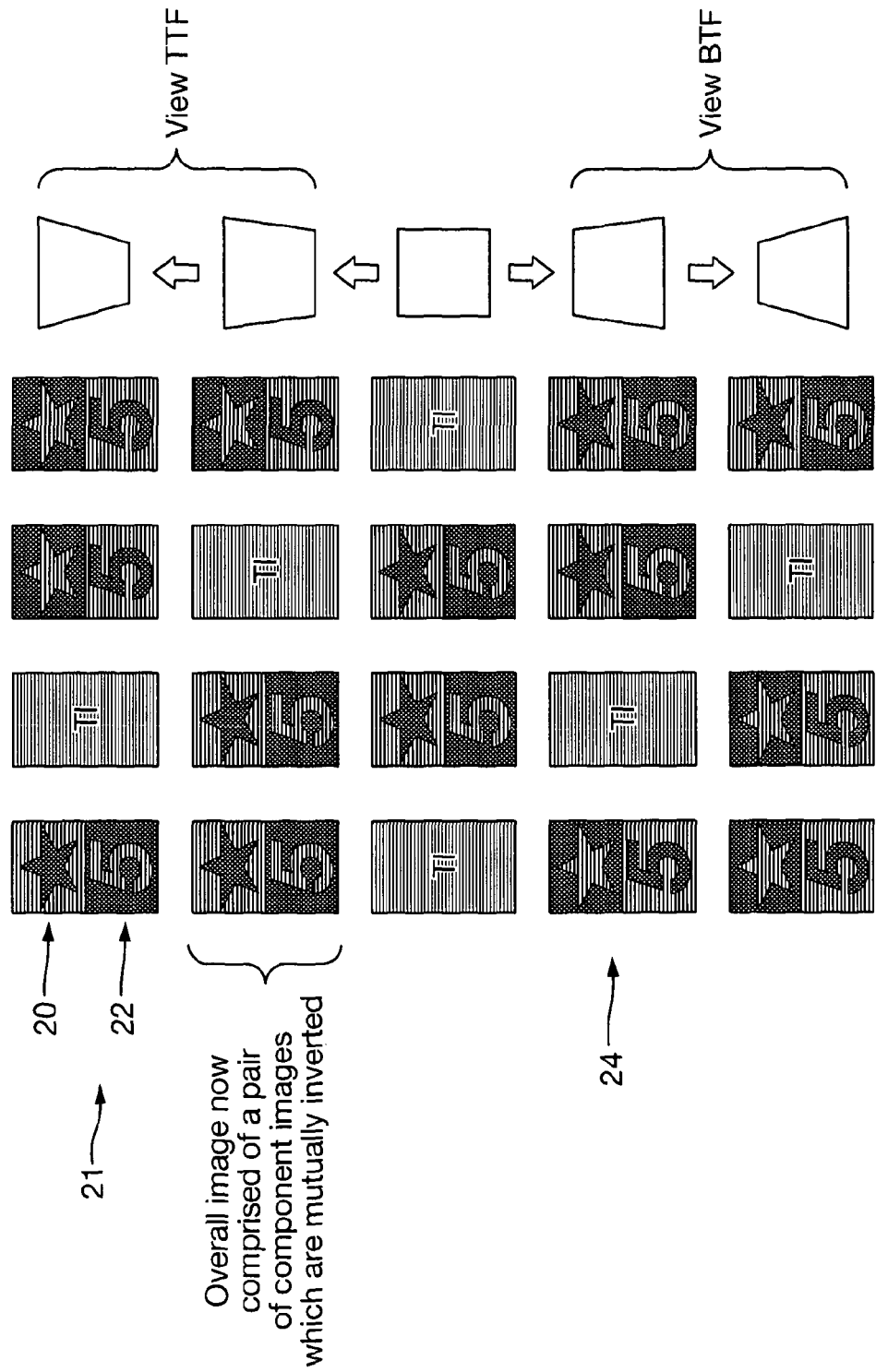

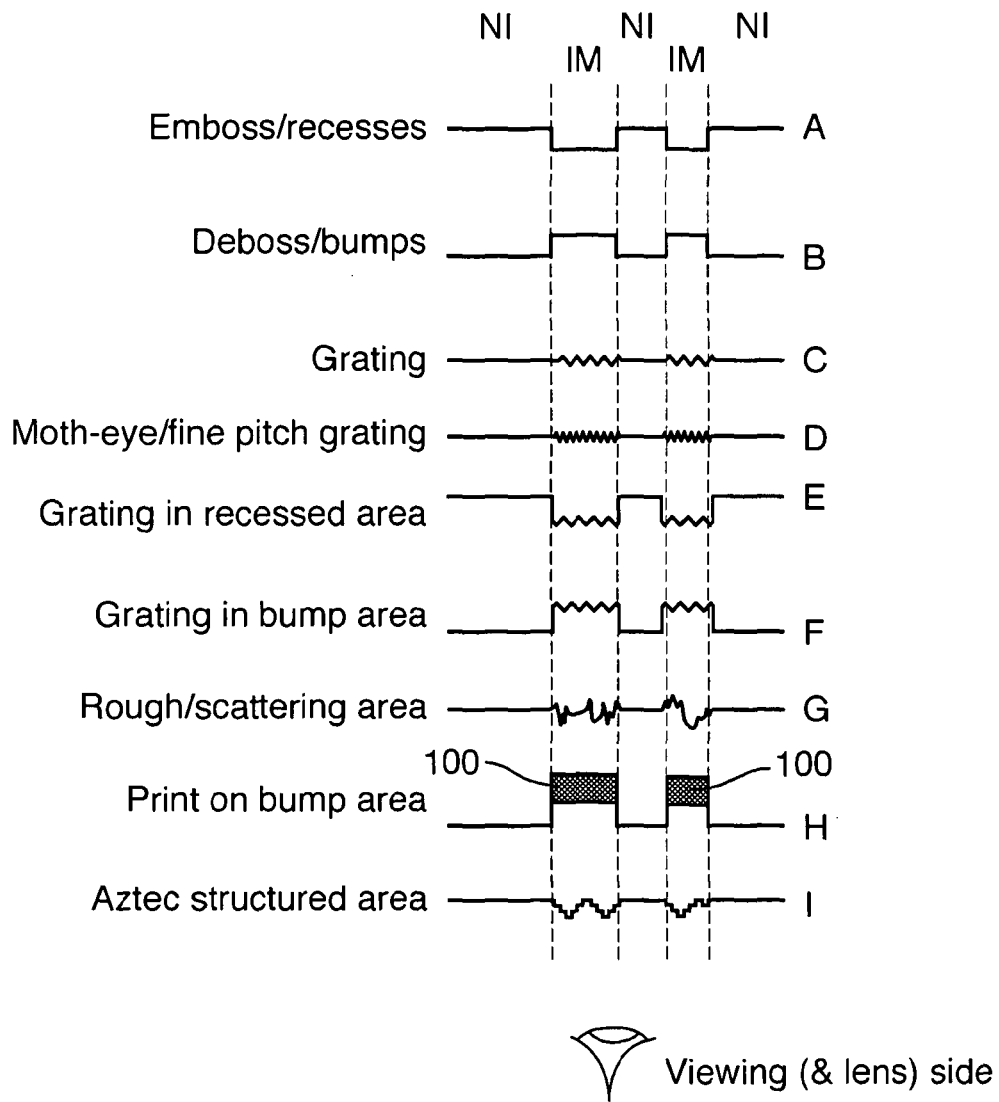

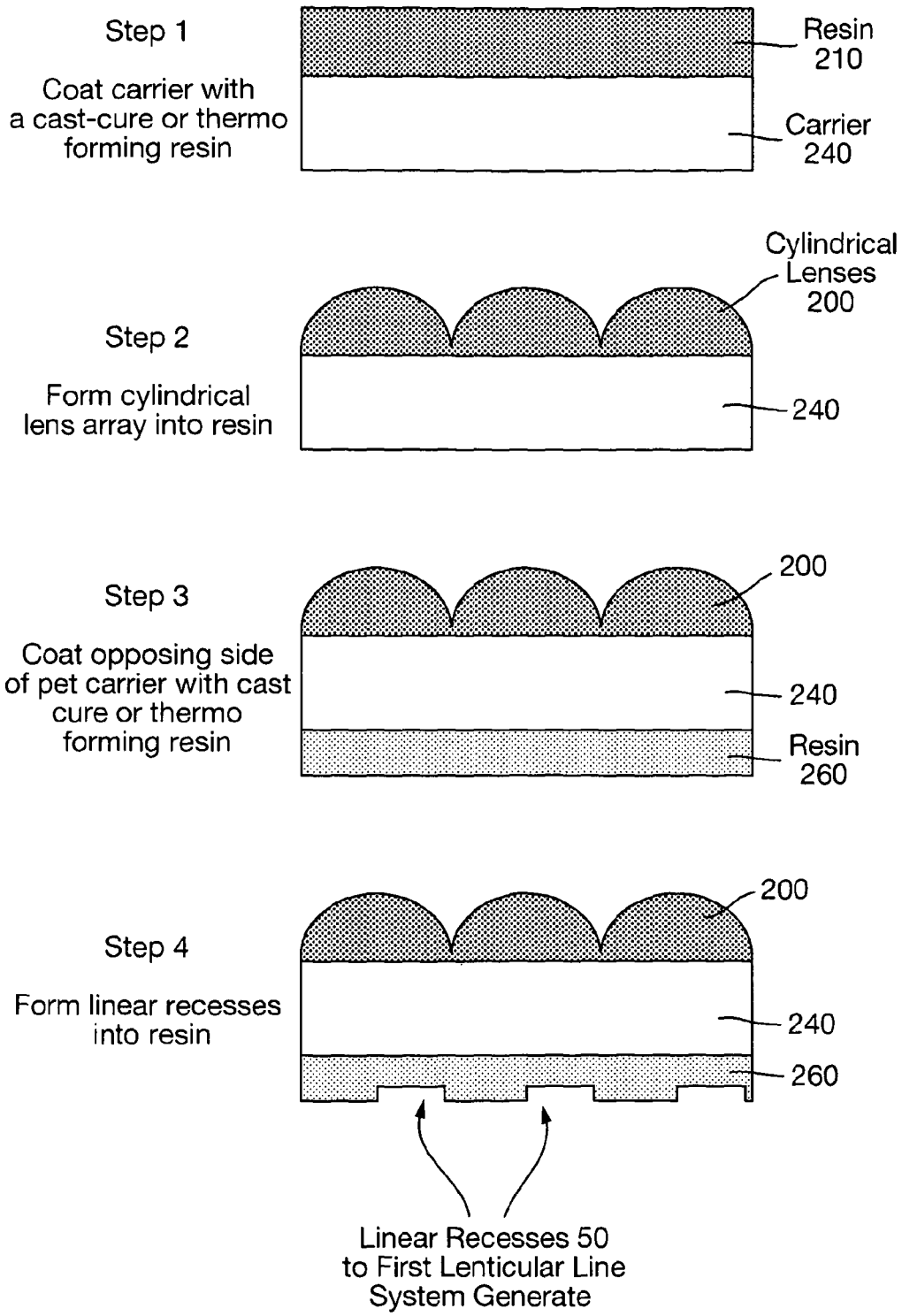

Fig.13 (Cont.)
Step 5
Uniformily coat surface, containing linear recesses, with first colourant.
Coating Method: Typically via Gravure or Annilox roller
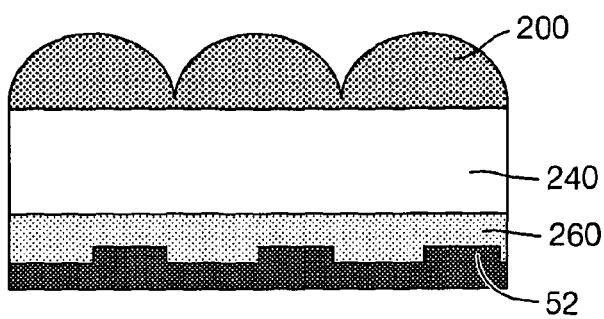
Step 6
First colourant is removed from non recessed land regions by method of Doctor Blading
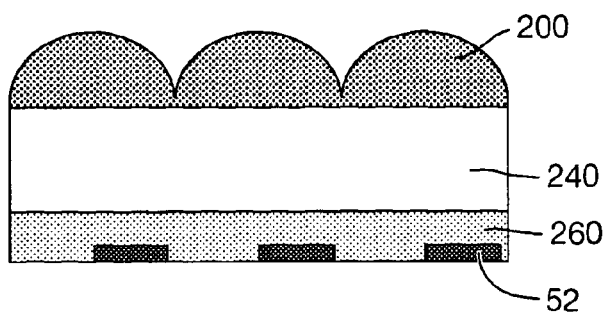
Step 7
Uniformily coat surface with second colourant.
Second colourant visible in land regions.
Coating method: Typically Gravure
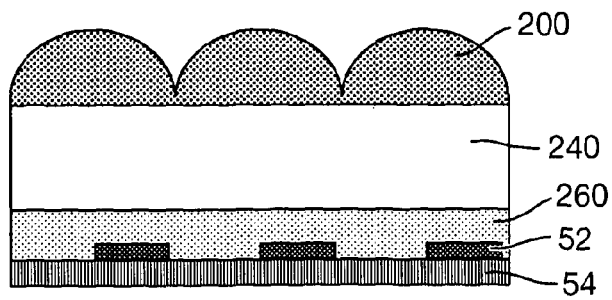

Fig.14
Steps 1 - 4 As With Fig.13.
Step 5A
Transfer first colourant onto non recessed linear regions by offset transfer.
Coating method: Offset from Annilox roller or litho blanket
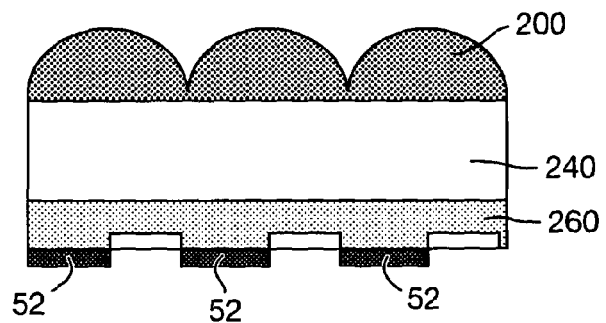
Step 6A
Uniformily coat with second colourant.
Coating method: Typically Gravure or offset litho
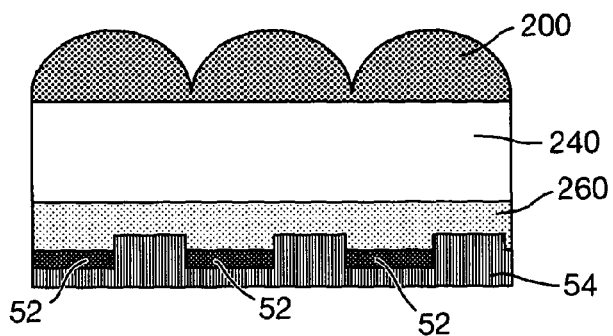

Fig.15
Step 1
Coat side of carrier (remote to observer) with cast cure or thermo forming resin
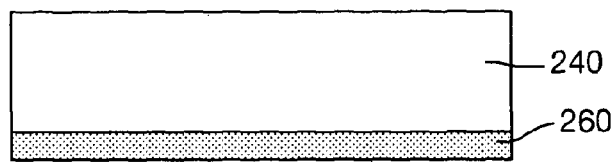
Step 2
Simultaneously form surface relief grating structure for image areas of views A and B into resin layer
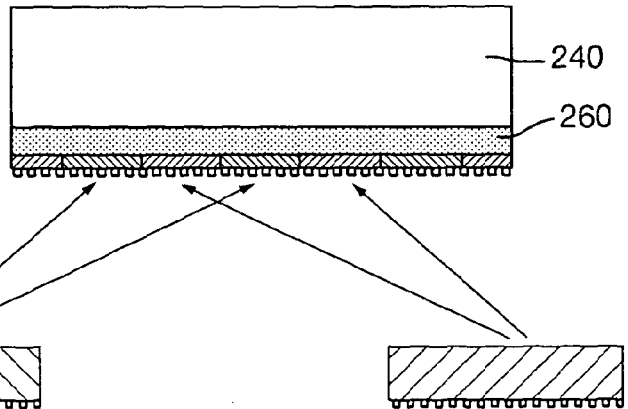
Grating structure pertaining to image areas in view A
Grating structure pertaining to image areas in view B

Fig.15 (Cont.)
Step 3
Apply reflection coating to grating surface relief structure
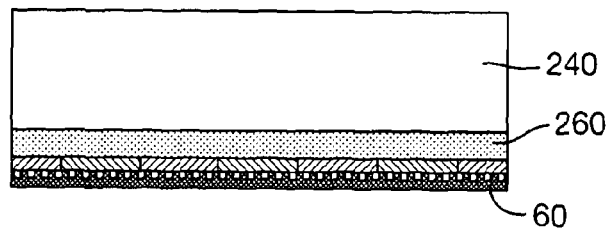
Step 4
Coat side of carrier nearest observer with a cast cure or thermo forming resin
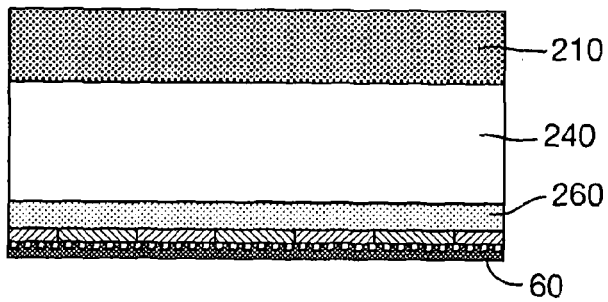
Step 5
Form cylindrical lens array into resin
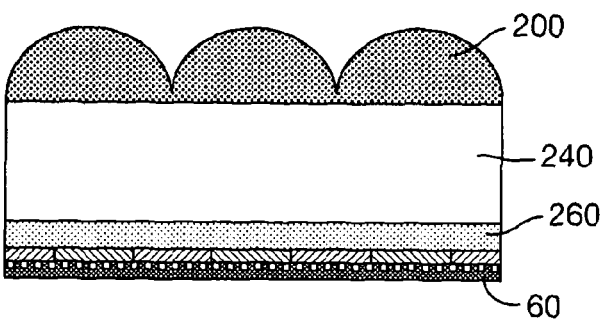

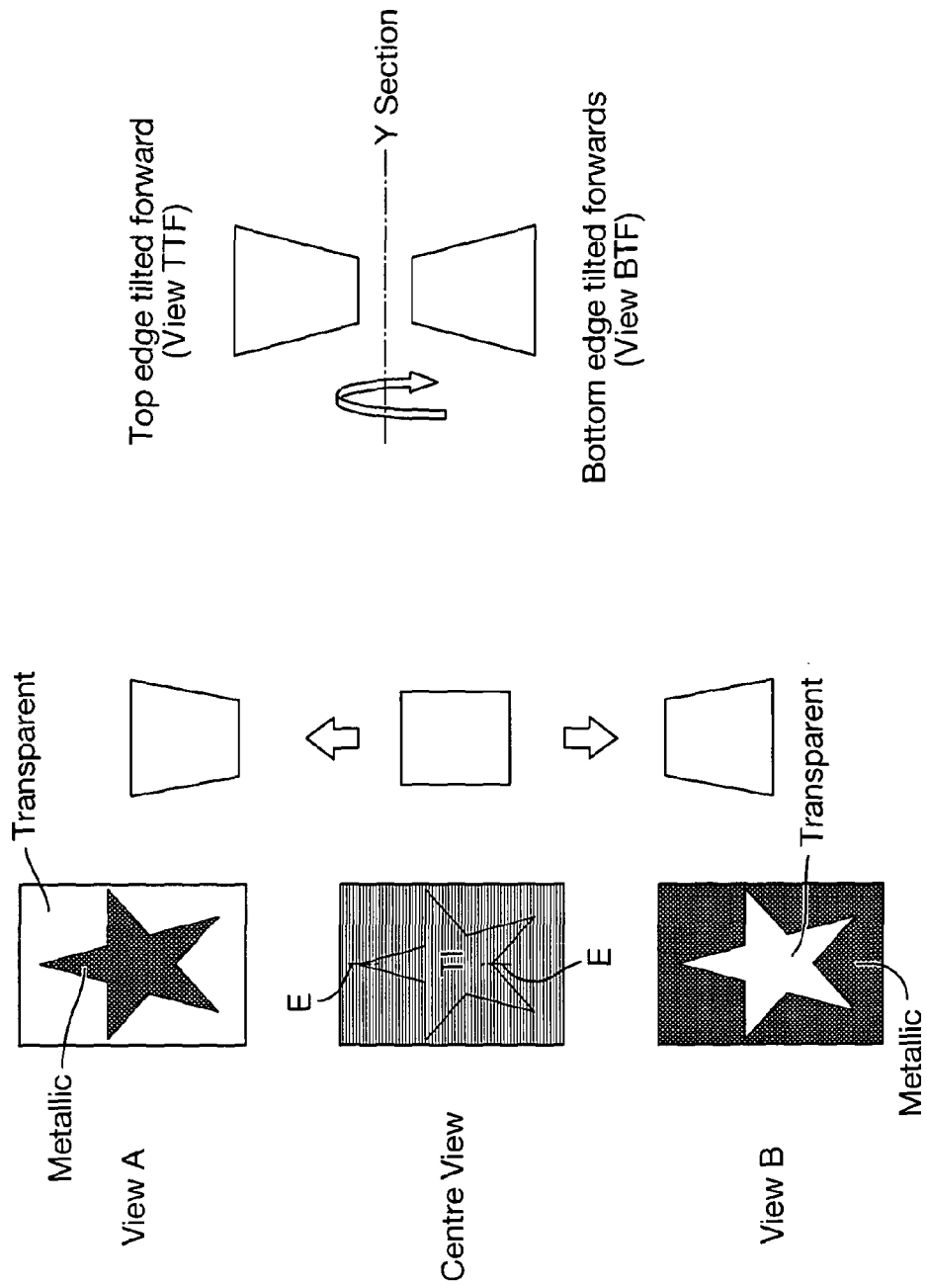

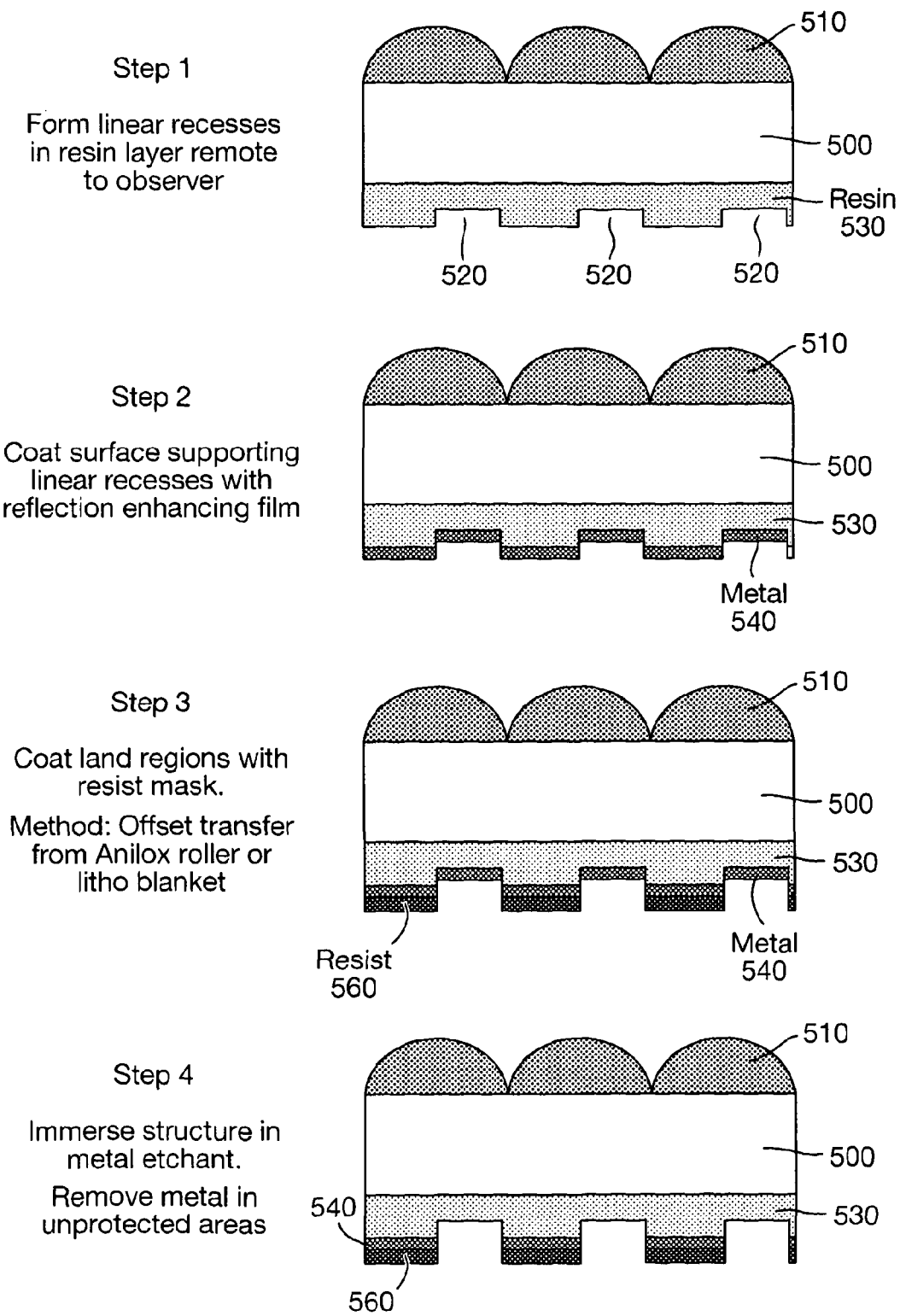

Fig.20
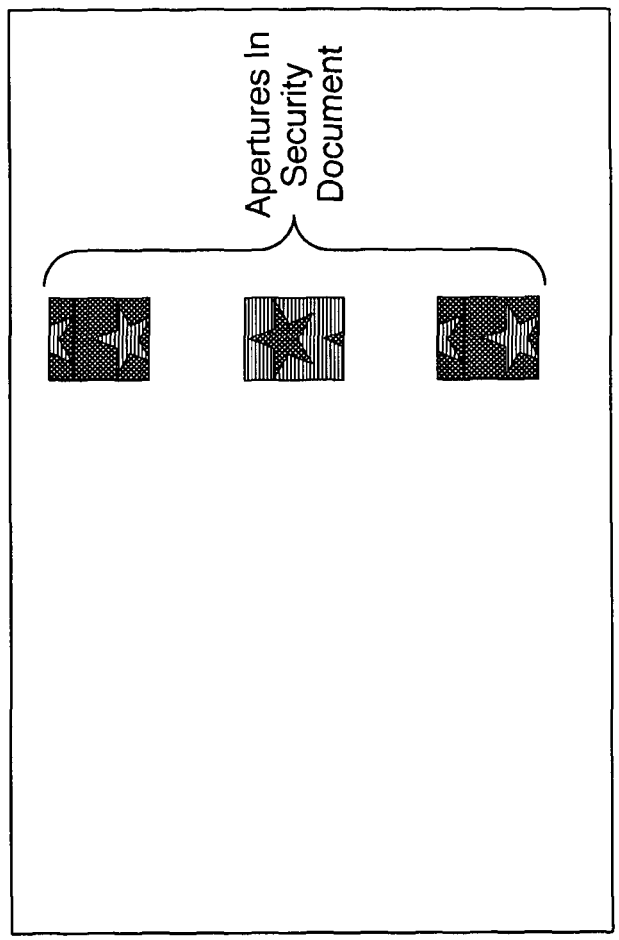
Apertures In Security Document
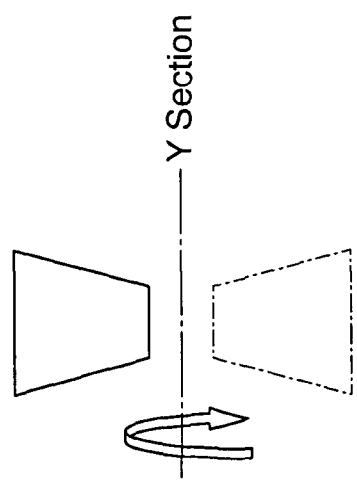
Top Edge Tilted Forward (View TTF)
Y Section Fig.21
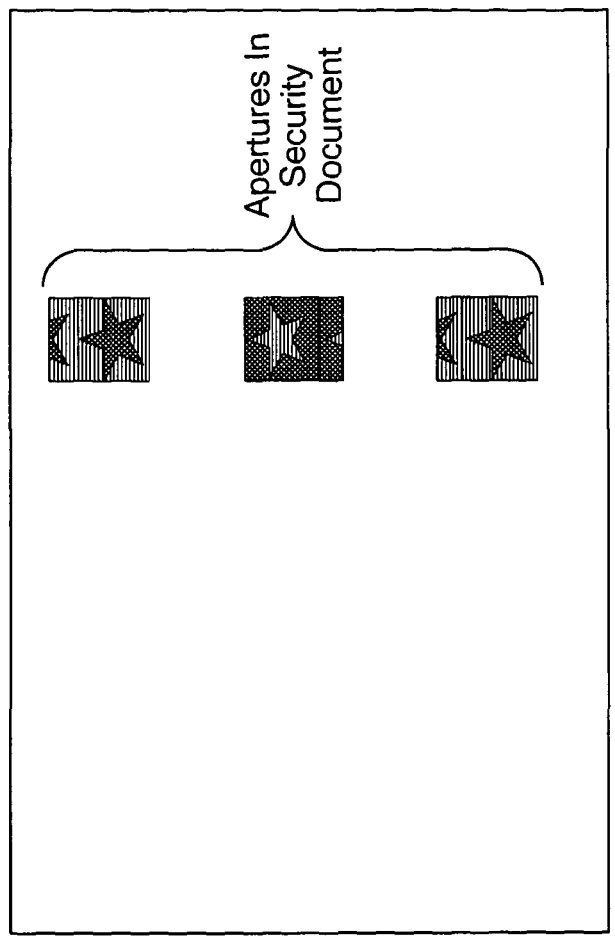
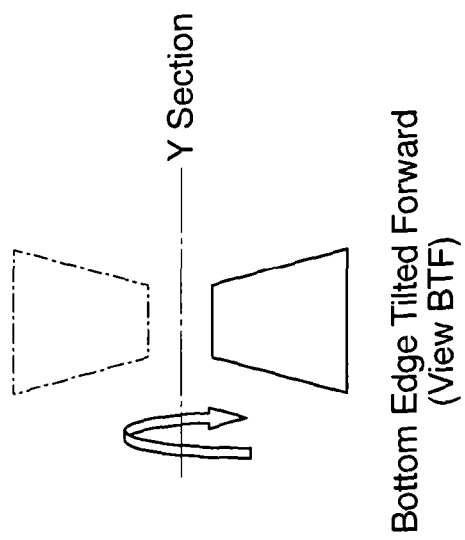

Fig.23
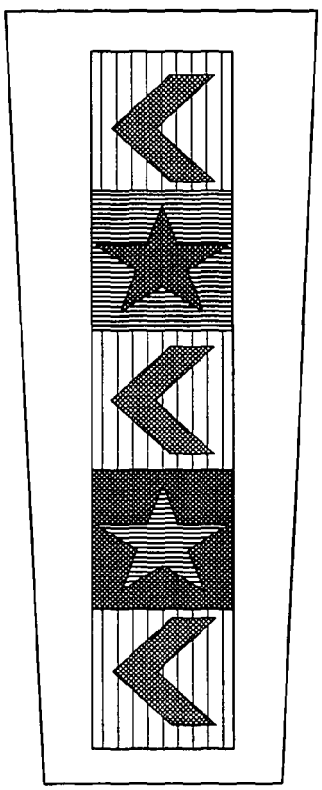
Device Tilted
Torwards Viewer
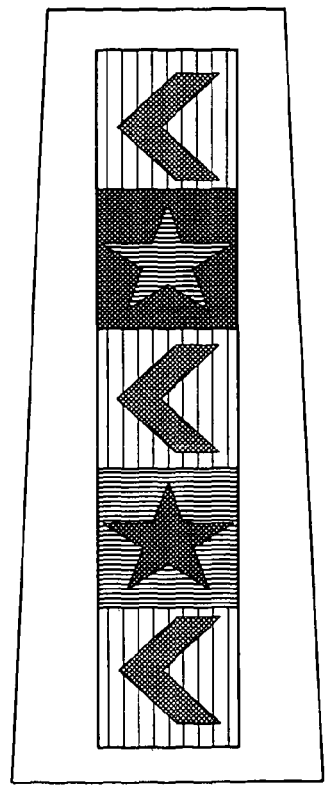
Device Tilted Away
From Viewer

SECURITY DEVICE

The invention relates to a security device, for example for use on articles of value such as banknotes, cheques, passports, identity cards, certificates of authenticity, fiscal stamps and other documents for securing value or personal identity.

Many different optical security devices are known of which the most common are holograms and other diffractive devices which are often found on credit cards and the like. However, counterfeiters are becoming increasingly sophisticated and are able to produce holographic-like devices which are difficult to distinguish from genuine devices by the untrained observer. It is also well known to use thin film interference structures, multilayer polymeric structures and liquid crystal structures to generate angularly dependent coloured reflection. Examples of security devices utilising thin film interference structures are described in U.S. Pat. No. 4,186,943 and US-A-20050029800 and examples of security devices utilising multilayer polymeric structures are described in EP-A-1047549. The problem with these materials is that they are typically expensive and the range of possible colours is limited by the fundamental optical characteristics of the materials. For example with liquid crystal materials the fact that the reflected light from a liquid crystal film is over a narrow band of wavelengths, which is a function of the pitch of its helical structure, limits the range of colours available for the security devices to substantially pure spectral colours. In addition the colourshift exhibited by a liquid crystal film is always from a colour with a long wavelength to a colour with a shorter wavelength, for example red to green, as the an angle of incidence is increased away from normal incidence.

It has also been known that so called lenticular devices can be used as security devices as, for example, described in U.S. Pat. No. 4,892,336. Typically, the microprinting used with these lenticular devices comprises strips of different colours such that when a device, such as a thread, is viewed at different angles, different colours will be perceived. One of the problems with this approach is the need for a very precise register between the microlenses and microprinting. In fact, in U.S. Pat. No. 4,892,336 this need for precise register is put forward as one of the advantages of that invention in that it makes it very much more difficult to counterfeit such security devices. On the other hand, for a security device to be useful commercially, genuine devices must be relatively easy to manufacture since otherwise production costs will be prohibitive.

U.S. Pat. No. 4,765,656 also describes a security device made using a lenticular screen and in this case the micro-images are formed by direct laser writing through the microlenses which are already in situ in the device. Again, this approach is not suited to mass production techniques although it does achieve exact register between the lenses and images.

Another example of a conventional lenticular device is described in WO03/052680.

U.S. Pat. No. 4,402,150 describes a lenticular device based around a latent image effect. Thus, when viewed perpendicularly or normally, the device presents a flat appearance, for example a red colour, but when viewed at other angles, a symbol is discerned against a coloured background.

AU-B-764842 describes a lenticular device which is transparent at one angle of view but exhibits an image at another.

U.S. Pat. No. 5,301,981 describes a lenticular film having a set of opaque lines on its lower surface. The film is adhered over an image or the like to prevent it from being photocopied because at a normal angle of instance the view appears opaque whereas at an acute angle it is possible to see the underlying information.

In accordance with a first aspect of the present invention, a security device has a lenticular device comprising an array of lenticular focusing elements located over a corresponding array of pairs of image strips such that, in a first viewing direction, a first image strip from each pair is viewed by respective ones of the lenticular focusing elements and, in a second viewing direction, different from the first, a second image strip from each pair is viewed by respective ones of the lenticular focusing elements and is characterized in that one of each pair of image strips has portions defining a first image in a first colour and a second image in a second colour respectively, and the other of each pair of image strips has portions defining the first image in the second colour and the second image in the first colour respectively, whereby on tilting the device, a colour switch is observed between the first and second images.

In accordance with a second aspect of the present invention, a method of manufacturing a security device comprises providing an array of lenticular focusing elements on one side of a transparent substrate; and providing a corresponding array of pairs of image strips on the other side of the transparent substrate, the image strips and lenticular focusing elements defining a lenticular device such that, in a first viewing direction, a first image strip from each pair is viewed by respective ones of the lenticular focusing elements and, in a second viewing direction, different from the first, a second image strip from each pair is viewed by respective ones of the lenticular focusing elements characterized in that one of each pair of image strips has portions defining a first image in a first colour and a second image in a second colour respectively, and the other of each pair of image strips has portions defining the first image in the second colour and the second image in the first colour respectively, whereby on tilting the device, a colour switch is observed between the first and second images.

With this invention, we provide a simple but secure security device which is easy to verify. This is because the observer will see a simple colour switch between the first and second images irrespective of the registration between the focussing elements and the image strips.

It should be understood that the term "colour" extends to diffractive colours i.e. the first and second colours could have a different diffractive effect and change colour with angle but in different ways.

Although the simple image switch provides some security, in the preferred example, the security device further comprises a second lenticular device having the same construction as the first lenticular device but in which each pair of image strips in a set are formed so that the first image strip defines portions of the first image in the second colour and the second image in the first colour respectively and the other of the pair of image strips in the set has portions defining the first image in the first colour and the second image in the second colour respectively.

With this arrangement, two lenticular devices, each providing their own colour switch, are provided and with those colour switches themselves being complementary. This device is verified by the observation of a complementary colour switch between the two devices and does not require a specific colour to be present at any particular angle and therefore reduces the need for registration between the lenticular focussing elements and the image strips.

Conveniently, the first and second lenticular devices are located adjacent one another although they could be spaced apart and, for example, separated by other optically variable devices such as lenticular devices, holograms, moiré magnification devices and the like.

So far the invention has been described in terms of a colour switch. In accordance with a third aspect of the invention, we provide a security device having a lenticular device comprising an array of lenticular focusing elements located over a corresponding array of pairs of strips such that, in a first viewing direction, a first strip from each pair is viewed by respective ones of the lenticular focusing elements and, in a second viewing direction, different from the first, a second strip from each pair is viewed by respective ones of the lenticular focusing elements characterized in that one of each pair of strips has one or more opaque portions defining a first image and one or more transparent portions defining a second image or background respectively, and the other of each pair of strips has one or more transparent portions defining the first image and one or more opaque portions defining the second image or background respectively, whereby on tilting the device, a switch in appearance is observed between the first and second images or background.

In accordance with a fourth aspect of the invention, we provide a method of manufacturing a security device, the method comprising providing an array of lenticular focusing elements on one side of a transparent substrate; and providing a corresponding array of pairs of strips on the other side of the transparent substrate, the strips and lenticular focusing elements defining a lenticular device such that, in a first viewing direction, a first strip from each pair is viewed by respective ones of the lenticular focusing elements and, in a second viewing direction, different from the first, a second strip from each pair is viewed by respective ones of the lenticular focusing elements characterized in that one of each pair of strips has one or more opaque portions defining a first image and one or more transparent portions defining a second image or background respectively, and the other of each pair of strips has one or more transparent portions defining the first image and one or more opaque portions defining the second image or background respectively, whereby on tilting the device, a switch in appearance is observed between the first and second images or background.

In these aspects of the invention, a simple switch between an opaque, typically reflective or metallic, and a transparent image and background is achieved. In the transparent view, underlying information on an article to which the security device is attached could be seen.

Typically, the first image comprises one of a symbol, character, or graphic device and preferably provides information from which the secure document can be identified or authenticated while the second image may comprise a background to the first image or preferably an additional image which may be the same as the first image.

The lenticular focusing elements typically comprise cylindrical lenses but could also comprise micromirrors. The periodicity and therefore maximum base diameter for the lenticular focussing elements is preferably in the range 5-200 μm, more preferably 10-60 μm and even more preferably 20-40 μm. The f number for the lenticular focussing elements is preferably in the range 0.25-16 and more preferably 0.5-2.

Since only two image strips are required, these can be simply printed onto the substrate although it is also possible to define the image strips using a relief structure. This enables much thinner devices to be constructed which is particularly beneficial when used with security documents.

The relief structures can be formed by embossing or cast-curing. Of the two processes mentioned, cast-curing provides higher fidelity of replication.

A variety of different relief structures can be used as will described in more detail below. However, the image strips could simply be created by embossing/cast-curing the images as diffraction grating areas. Differing parts of the image could be differentiated by the use of differing pitches or different orientations of grating providing regions with a different diffractive colour. Alternative (and/or additional differentiating) image structures are anti-reflection structures such as moth-eye (see for example WO-A-2005/106601), zero-order diffraction structures, stepped surface relief optical structures known as Aztec structures (see for example WO-A-2005/115119) or simple scattering structures. For most applications, these structures could be partially or fully metallised to enhance brightness and contrast.

Typically, the width of each image strip formed by a relief or by printing is less than 100 microns, preferably less than 50 microns, most preferably in the range 5-25 microns.

Although the pairs of image strips need not be registered with the lenticular focusing elements, they should have a similar periodicity.

The security device may comprise a metallised layer either as part of the image structures or as an additional layer. Preferably such a layer is selectively demetallised at a number of locations. In addition the device may further comprise a layer of resist upon the metallised layer. The metallised layer and/or the layer of resist is preferably arranged as indicia.

It is also preferred that the device is arranged to be machine-readable. This may be achieved in a number of ways. For example at least one layer of the device (optionally as a separate layer) may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

The security device may be used in many different applications, for example by attachment to objects of value. Preferably, the security devices are adhered to or substantially contained within a security document. The security device may therefore be attached to a surface of such a document or it may be partially embedded within the document. The security device may take various different forms for use with security documents, these including a security thread, a security fibre, a security patch, a security strip, a security stripe or a security foil as non-limiting examples.

Some examples of security devices and methods according to the invention will now be described and contrasted with a known device with reference to the accompanying drawings, in which:—

FIG. 3 illustrates the appearance of the device of FIG. 2 at different tilt angles;

FIG. 4A illustrates the appearance of a first example of a device according to the invention when viewed at different tilt angles;

FIG. 4B illustrates schematically the structure of the example shown in FIG. 4A;

FIG. 6a illustrates examples of a related art device for different degrees of registration between the lenses and image strips;

FIG. 6c illustrates a modified example in which an intermediate region exists between the image and background;

FIG. 6d illustrates schematically one way of implementing the intermediate region;

FIG. 6e illustrates the appearance of the device shown in FIG. 6c at different viewing angles;

FIG. 6f illustrates schematically another method for implementing the intermediate region;

FIG. 6g illustrates the appearance of a device constructed using the method of FIG. 6f;

FIG. 7a is a view similar to FIG. 6b but showing a further example of a device in which two lenticular devices are provided side by side exhibiting complementary colour switching effects;

FIG. 7b illustrates a modification of the FIG. 7a example;

FIGS. 12A-12I illustrate different examples of relief structures defining image strips according to the invention;

FIG. 13 illustrates successive stages in a first example of a method of manufacturing a security device according to the invention;

FIG. 14 illustrates a modified version of the method illustrated in FIG. 13;

FIG. 15 illustrates an alternative method to that of FIG. 13;

FIGS. 17a and 17b illustrate an alternative example of the invention utilizing metallic and transparent regions;

FIG. 18 illustrates a method for forming a device of the type shown in FIG. 17;

FIGS. 20 and 21 illustrate the appearance of the security thread shown in FIG. 19 at different viewing angles;

FIGS. 22 and 23 illustrate an alternative example to that shown in FIGS. 8 and 9 at different viewing angles;

Figure 1:
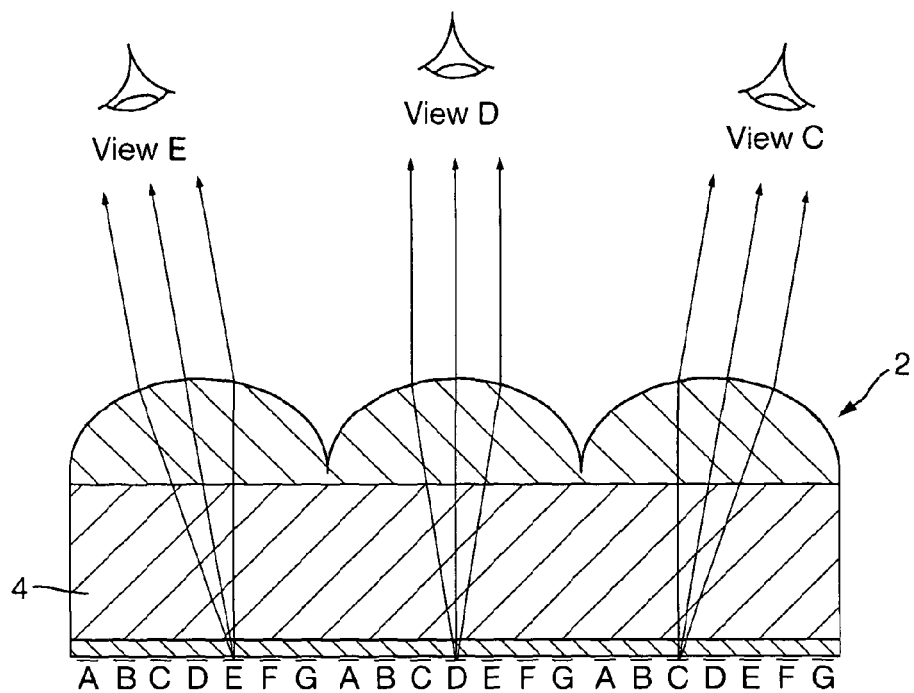
FIG. 1 is a schematic cross-section through a known lenticular device.
Figure 2:
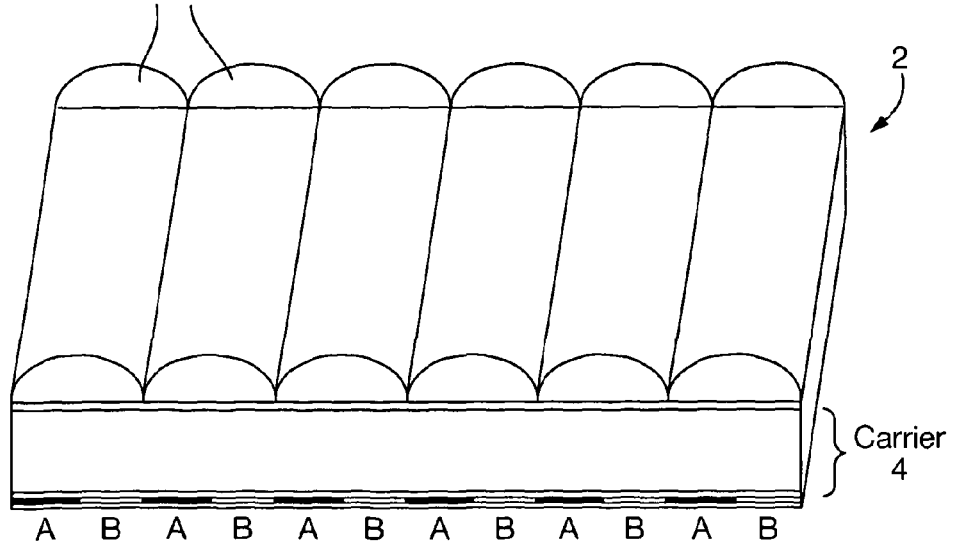
FIG. 2 is a perspective view from above of a modified form of the known lenticular device of FIG. 1.

A known lenticular device is shown in FIGS. 1-3. FIG. 1 shows a cross-section through the known lenticular device which is being used to view images A-G. An array of cylindrical lenses 2 is arranged on a transparent substrate 4. Each image is segmented into a number of strips, for example 10 and under each lens 2 of the lenticular array, there is a set of image strips corresponding to a particular segmented region of images A-G. Three sets are shown in FIG. 1. Under the first lens the strips will each correspond to the first segment of images A-G and under the next lens the strips will each correspond to the second segment of images A-G and so forth. Each lens 2 is arranged to focus in the plane of the strips such that only one strip can be viewed from one viewing position through each lens 2. At any viewing angle, only the strips corresponding to one of the images (A,B,C etc.) will be seen through the corresponding lenses. As shown, each strip of image D will be seen from straight on whereas on tilting a few degrees off-axis the strips from images C or E will be seen.

The strips are arranged as slices of an image, i.e. the strips A are all slices from one image, similarly for B, C etc. As a result, as the device is tilted a series of images will be seen. The images could be related or unrelated. The simplest device would have two images that would flip between each other as the device is tilted. Alternatively, the images could be a series of images that are shifted laterally strip to strip generating a lenticular animation effect so that the image appears to move. Similarly, the change from image to image could give rise to more complex animations (parts of the image change in a quasi-continuous fashion), morphing (one image transforms in small steps to another image) or zooming (an image gets larger or smaller in steps).

FIG. 2 shows the lenticular device in perspective view although for simplicity only two image strips per lens are shown labelled A,B respectively. The appearance of the device shown in FIG. 2 to the observer is illustrated in FIG. 3. Thus, when the device is arranged with its top tilted forward (view TTF), the image strips A will be seen while when the device is arranged with its bottom tilted forward (view BTF) then the image strips B will be seen.

FIGS. 4A and 4B illustrate a first example of a security device according to the invention. In this device, an array of cylindrical lenses 2 is provided on a transparent substrate 4, as before, while pairs of image strips A,B are provided on the other side of the substrate 4 located at the focal distance of each lens. In this case, the strips A,B are registered with each lens 2. When the device is viewed from the right, as seen in FIG. 4B, the image strips A will be seen in the region of the star through each lens 2 and when the device is viewed from the left, the image strips B will be seen in the region of the star. The resulting appearance of the device is shown in FIG. 4A where view A corresponds to viewing the device from the right in FIG. 4B and view B corresponds to viewing the device from the left in FIG. 4B.

Typical thicknesses of security devices according to the invention are 2-100 microns, more preferably 20-50 microns with lens heights of 1-50 microns, more preferably 5-25 microns. The periodicity and therefore maximum base diameter for the lenticular focussing elements is preferably in the range 5-200 μm, more preferably 10-60 μm and even more preferably 20-40 μm. The f number for the lenticular focussing elements is preferably in the range 0.25-16 and more preferably 0.5-2.

It will be observed in FIG. 4A that the appearance of the device is of a symbol 10, in this case a star shape, seen against a background 12. The colours of the symbol and substrate 10,12 are chosen so that in view A, the symbol 10 has a first colour such as red and the background 12 a second colour such as blue while in view B, the colours are switched or reversed so that the star 10 has the second colour (blue) and the background 12 has the first colour (red).

Figure 5:
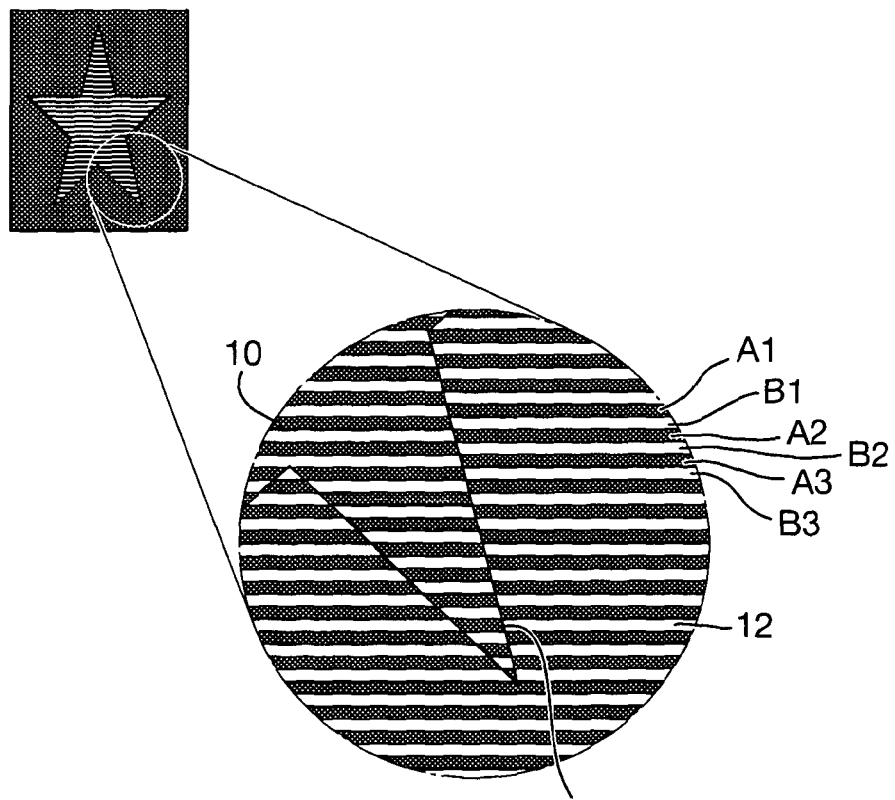
FIG. 5 illustrates a detail of the structure of the FIG. 4 device in enlarged form.

The manner in which this colour switch is achieved is shown in FIG. 5. In this Figure, part of the star symbol 10 is shown along with part of the background 12. Some of the image strips A,B have been labelled A1,B1;A2;B2; etc. Each pair of image strips A,B is registered under a corresponding lens 2 as shown in FIG. 4B.

For simplicity, in this example, we will refer to the colours as "black" and "white" as shown in FIG. 5 although any pair of colours or regions of different reflectivity could be used.

Considering first the image strip A1, it will be seen that in the background region 12 the strip is black but in the symbol region 10 it changes to white. In contrast, the image strip B1 is white in the background region 12 and black in the symbol region 10. This lateral half-shift between the lines of the symbol and background means that the effect observed and shown in FIG. 4A is achieved.

In this example, the substrate 4 is typically a transparent polymeric material, for example bi-axial PET or polypropylene, and could be in the form of a self-supporting label which would then be adhered to an article or alternatively could be an integral part of an article. Thus, the device could form part of a security thread or the substrate 4 could be a substrate of the article itself such as a document of value, for example a banknote. In this case, the device will be provided in a transparent window of the banknote.

The periodicity and therefore maximum base diameter for the lenticular focussing elements is preferably in the range 5-200 μm, more preferably 10-60 μm and even more preferably 20-40 μm. The f number for the lenticular focussing elements is preferably in the range 0.25-16 and more preferably 0.5-2. They are typically formed by UV cast-cure replication or thermal embossing.

In this example, the image elements in strips A and B are printed by any suitable printing technique including but not limited to offset lithography, gravure, screen, flexographic printing onto the underside of the substrate 4. Thus the image elements in Strips A and B in the first colour will first be printed and then a continuous overprint of the second colour forming its respective image elements in Strips A and B. This second colour will be obscured where it is in alignment with the first colour. Other methods of providing the image elements in the strips will be described below.

Figure 6B:
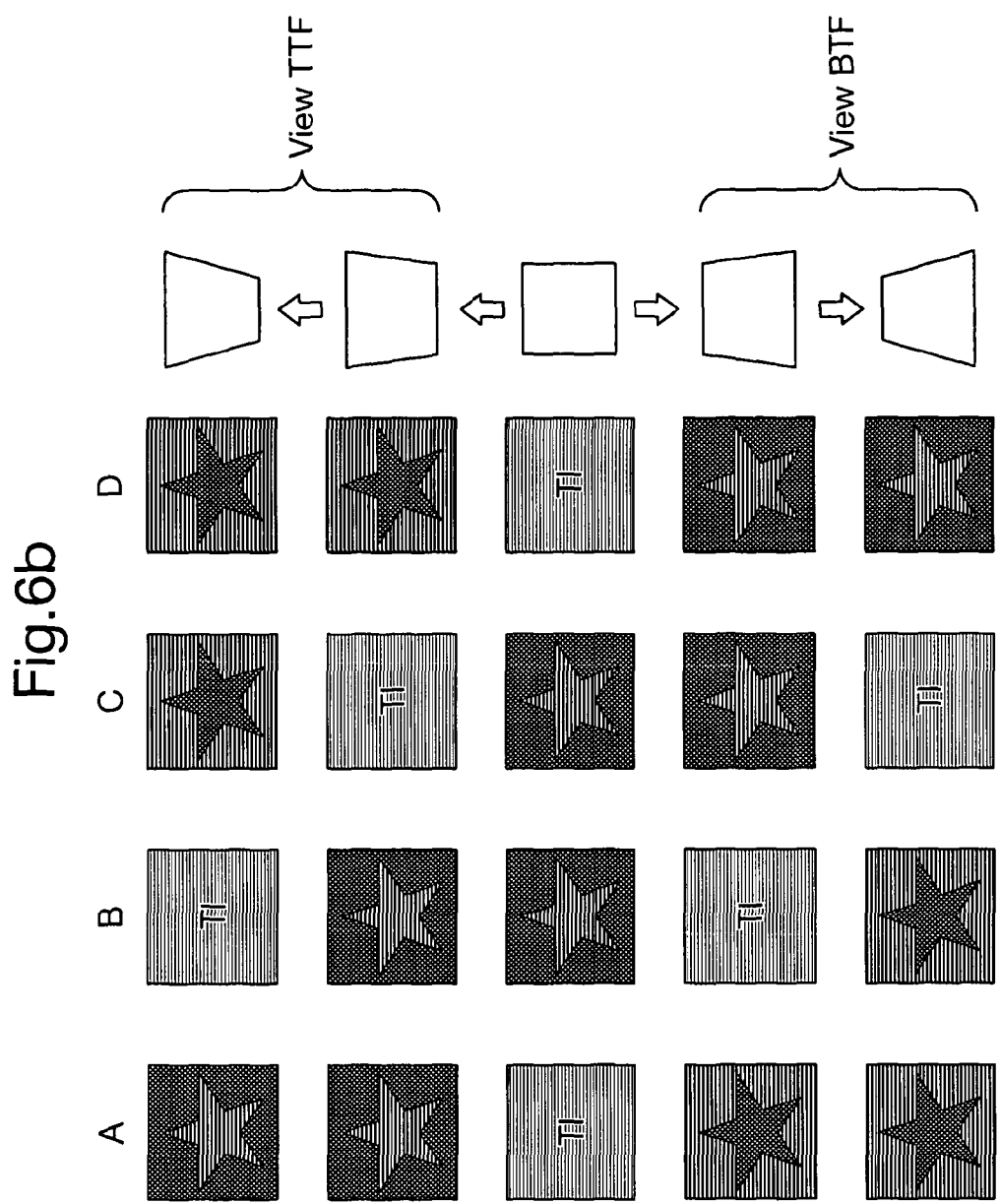
FIG. 6b illustrates the appearance of four further examples of a device according to the invention, similar to the first example, but in which the registration between the cylindrical lenses and the image strips is different in each case.

In the example just described, the image strips A,B are registered with the lenses 2. The exact registration of the image strips and the lens enables the device to be configured such that it is known at what angle the different views are observed, i.e. in reference to FIG. 4A such that the black star is always observed when tilting forwards and the black background is always observed when tilting backwards. However, registration is not essential and FIG. 6b illustrates an example in which the image strips are not registered. In this case the angle at which the different views occur depend upon the position of the strips under the lenses and FIG. 6b shows four possible variations depending on this position. For example variant A is for the case where the registration is exact and two image strips sit under a singe lens. A transient states (TI) exists between the two switching positions, in this case where this is no tilt. Variant D is also for the case where the registration is exact but in this case the image strips are inverted relative to their position in variant A. Variants B and C show intermediate positions between variants A and D where the strips only partly sit under a single lens. The advantage of the current invention is that whatever the registration the viewer will always observe the complementary switch between the image and the background. This is contrast to the related art where there is no image and background and therefore no complementary switch between an image and a background region. In this case the authentication relies completely on the switch of the single region and the angle at which this occurs.

FIG. 6a illustrates an example of the related art with different degrees of registration between the image strips and microlenses. As with FIG. 6b variants A and B are for the case where the registration is exact and two image strips sit under a singe lens and one colour is observed by tilting forward (TTF) and a different colour observed by tilting backward (BTF). A transient state (TI) is observed between the two colours when the device is not tilted. However for variants B and C where the register is not exact the switch from one colour to another occurs only when the device is tilted significantly away from the non-tilted position and therefore may not be observed by the authenticator.

Figure 26:
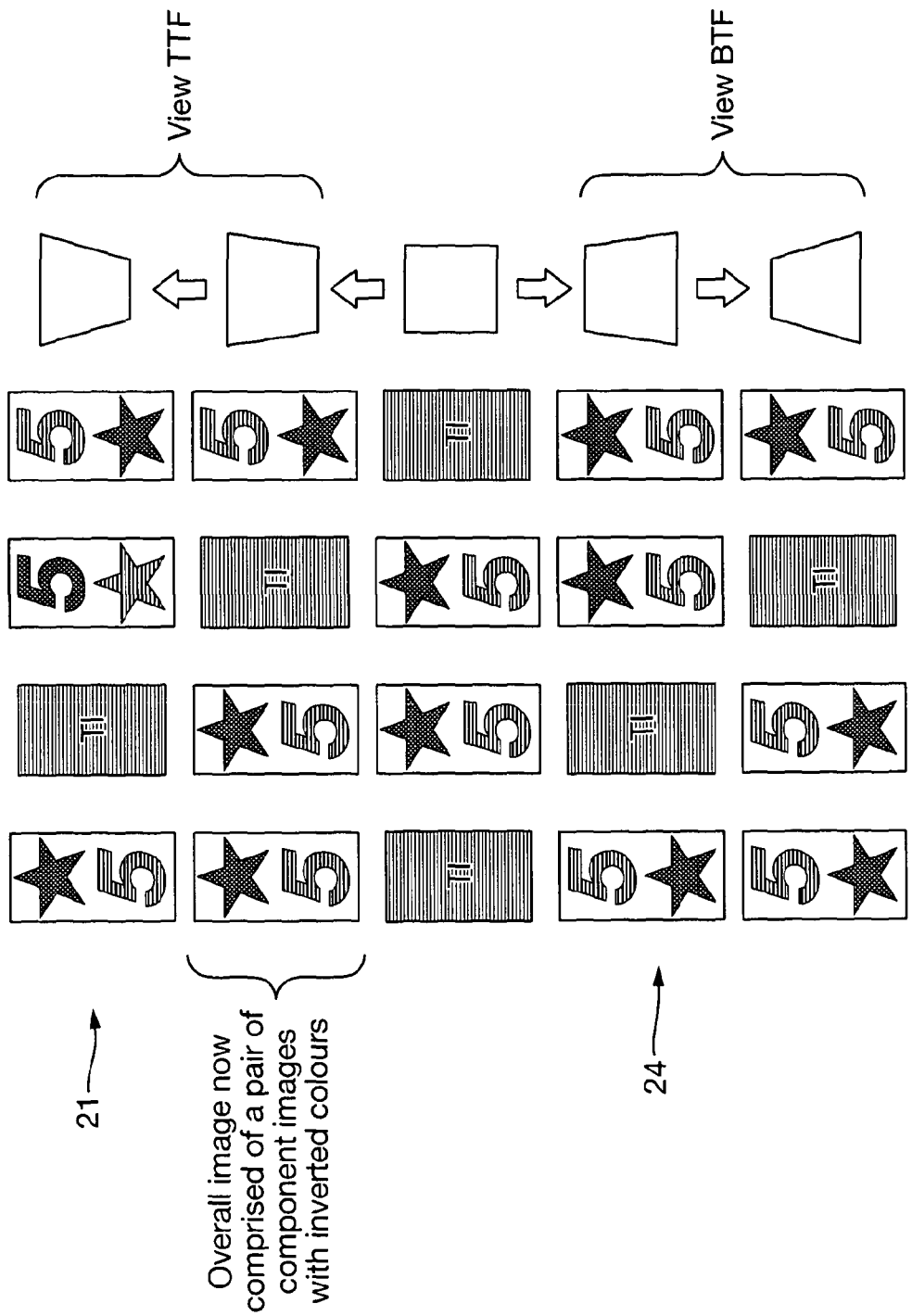
FIG. 26 is a view similar to FIG. 6a but utilizing a second image instead of a background.

FIG. 26 illustrates a similar embodiment to that shown in FIG. 6b but where the image elements which form the background in FIG. 6b now alternatively form a second image in FIG. 26. Thus, the device in FIG. 26 at a first viewing angle 21 displays a red star symbol and a blue numeral five. When the device is tipped to a different viewing angle as shown, for example, at 24, the two images are inverted so that the star symbol is blue and the numeral five is red. As with the example in FIG. 6b the device comprises two views A and B where the image elements in the strips forming view A in the region of the star are red and in the region of the numeral five are blue, and conversely the image elements in strips forming view B in the region of the star are blue and in the region of the numeral five are red.

The presence of an indistinct transient or switching image (TI) may not be desirable and therefore in a further embodiment an intermediate region such as a boundary region is created between the star and the background and this is shown in FIG. 6c. The foreground region (FR) is the region inside the star, the background region (BR) is the region outside the star and the intermediate region (IR) is between the star and the background. FIG. 6d shows the image strips in this intermediate region. For simplicity, in this example, we will refer to the colours as "black" and "white" as shown in FIG. 6d although any pair of colours or regions of different reflectivity could be used.

Considering first the image strip Al, it will be seen that in the background region (BR) 12 the strip is white but in the symbol region (FR) 10 it changes to black. However in the intermediate region the strip is half black and half white. In contrast, the image strip B1 is black in the background region (BR) 12 and white in the symbol region (FR) 10 and in the intermediate region is half white and half black in a inverse pattern of the intermediate region in A1. There is therefore a lateral quarter-shift between the lines of the symbol and the intermediate region and the lines of background and the intermediate region.

FIG. 6e shows the behaviour of a device with the grid structure in FIG. 6d. In this case the black elements associated with the IR are centred under the lenslets. When the device is viewed at normal incidence (centre view), i.e. not tilted, the intermediate region will be visible providing a dark outline of the image, on tilting the device around the Y-section as shown in FIG. 6e the device will switch in the manner described with reference to FIG. 4A. In view A and B the IR will be in a transient state between the white and black colours. Alternatively the white elements associated with the IR are centred under the lenslets and thus a white outline of the image is provided in the transient state.

FIG. 6f shows a further embodiment of the IR such that the colour of the IR region does not change on tilting. As with the previous example there is a lateral quarter-shift between the lines of the symbol and the intermediate region and the lines of background and the intermediate region. However in this example in a direction transverse to the axis of curvature of the lens-lets the linear line or grid system in the IR region is divided into a sub grid system of width TW. Considering first the image strip A1 the top half of the image strip in the IR is predominantly white with a black region of width TW, and the bottom half of the strip is predominantly black with a white region of width TW. Strip B1 is the inverse of strip A1. There is a lateral half-shift between the lines of the sub grid region and the remainder of the IR. This means that in the IR both colours will be visualised simultaneously and if TW has a dimension less than that which can be visualised with the naked eye the observer will visualise colourmixing. The width of TW is preferably in the range 10-100 μm and even more preferably 20-50 μm.

FIG. 6g shows the behaviour of a device with the grid structure in FIG. 6f and shows that the boundary line to the star (IR) remains fixed in colour on tilting.

Figure 6H:
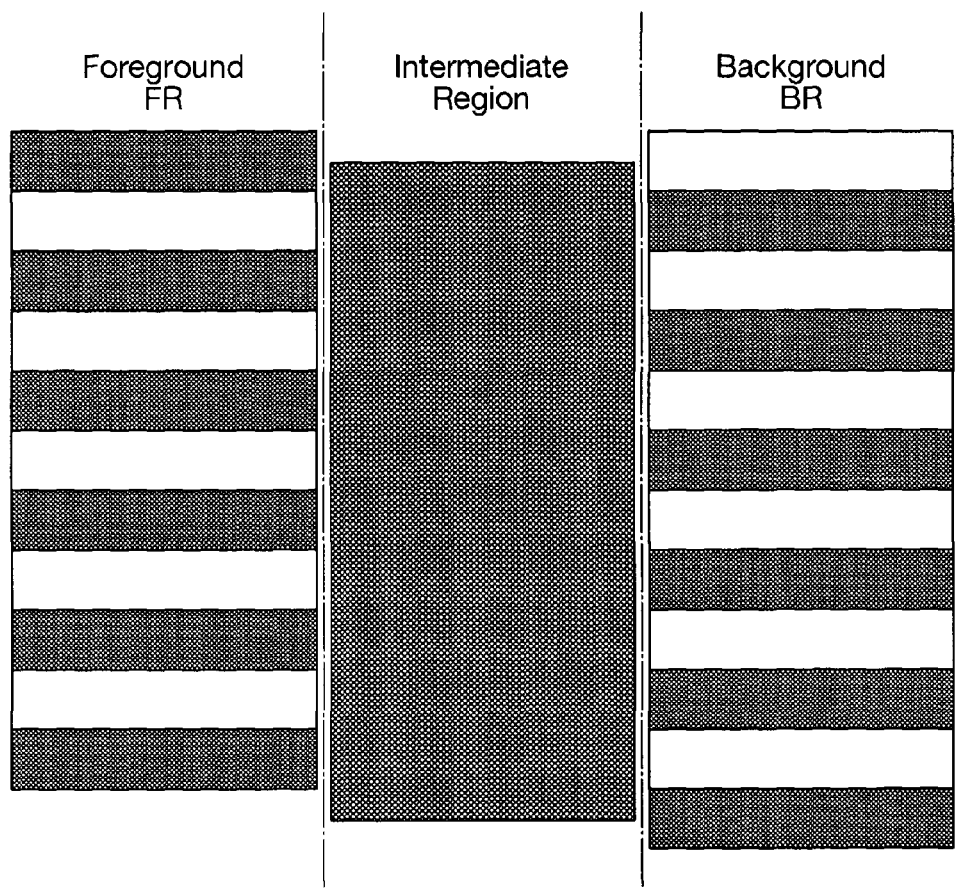
FIG. 6h illustrates schematically a third method of implementing the intermediate region.
Figure 6I:
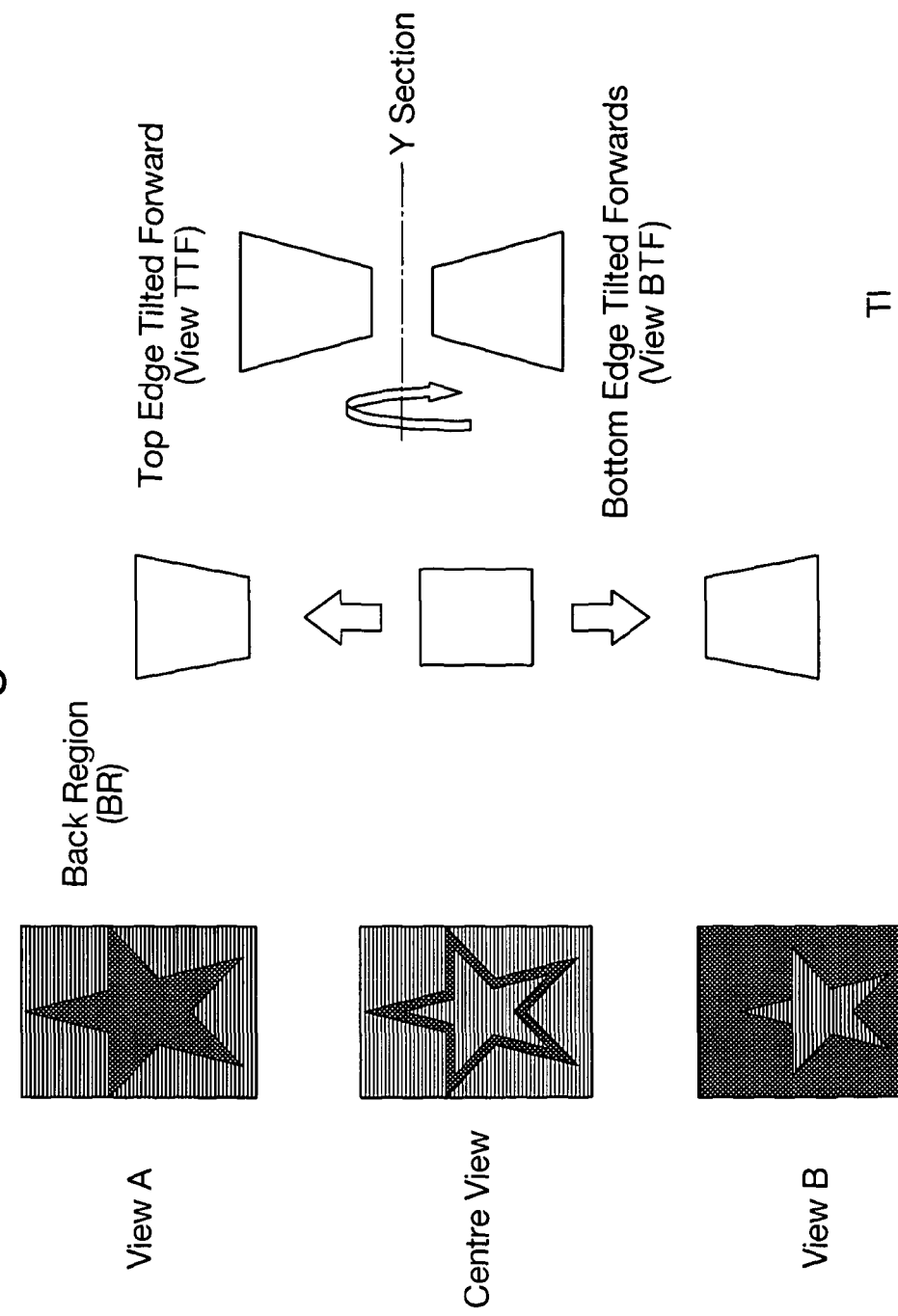
FIG. 6i illustrates the appearance of a security device constructed using the method of FIG. 6h at different viewing angles.

FIGS. 6h and 6i show an alternative embodiment where the IR is provided with a uniform colourant which in this case is the black colour. In this case the IR will remain black on tilting as shown in FIG. 6i.

FIG. 7a illustrates a further example of a security device according to the invention. In this case, two lenticular devices 20,22 according to examples of the invention are provided side by side and when visible at any particular viewing angle will exhibit contrasting colours. Thus, the device 20 at a first viewing angle 21 displays a red star symbol against a blue background while the device 22 displays a blue star symbol against a red background. When the device is tipped to a different viewing angle as shown, for example, at 24, each device has exhibited a respective colour switch so that the star symbol of the device 20 is blue against a red background while the star symbol of the device 22 is red against a blue background.

Figure 19:
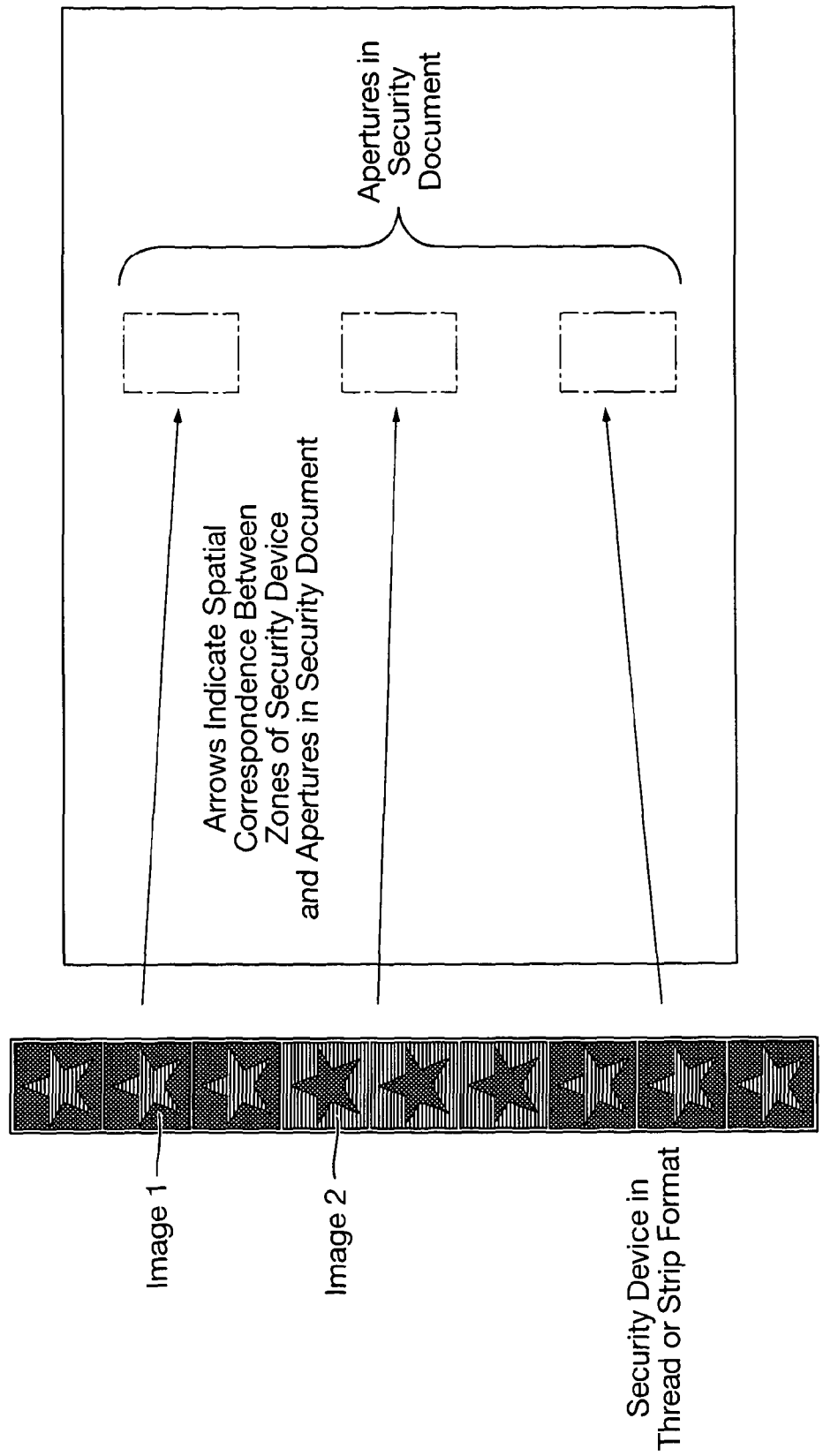
FIG. 19 illustrates the use of the device shown in FIGS. 6 and 7 as a security thread.

Whilst the first example provides a simple way for an observer to validate the device by noting the colour switch, the device of FIG. 7a provides even more security by requiring complementary colour shifts between two devices. This provides a very valuable device in view of its ease of verification and the fact that the feature being verified, which is the complementary colour shifts between two devices, does not require exact registration between the image, strips and the focussing elements. FIG. 19 shows the use of the concept described in FIGS. 6b and 7a for use on a security thread. In this case images 1 and 2 and the complementary background regions are periodically repeated along the long axis of the thread or strip such that image 1 and image 2 are viewable in alternate windows of the security document. As with previous embodiments the image and its complementary switch are seen on tilting the device and this is illustrated in FIG. 20 for the case where the device is tilted forward and in FIG. 21 for the case where the device is tilted backward. It can be seen on tilting forwards and then backward the observer see the inversion of the images in each window.

FIG. 7b illustrates a further example similar to that shown in FIG. 7a but for the case where the two lenticular devices display different images, i.e. lenticular device 22 has been replaced with lenticular device 23 which displays a blue numeral 5 against a red background. The rest of the device remains the same as shown in FIG. 7a.

Figure 8:
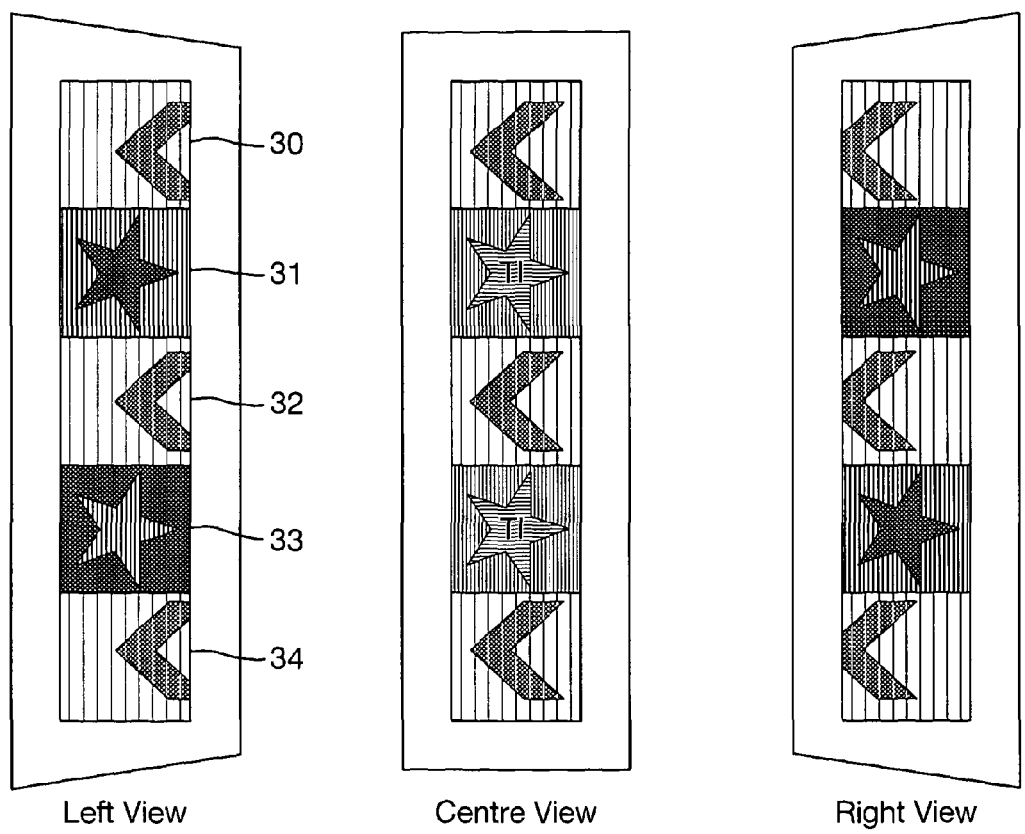
FIG. 8 illustrates another example in which further lenticular devices exhibiting parallax motion are incorporated.

Another example of a security device according to the invention is shown in FIG. 8, in this case in the form of a security thread. The device comprises five lenticular devices 30-34 abutting one another. The devices 31,33 are constructed in accordance with the device of FIG. 4 and exhibit complementary colour shifts with respect to each other (as described with reference to FIG. 7). The cylindrical lenses of the devices 31,33 extend vertically.

The lenticular devices 30,32,34 are of a conventional construction and define chevron style images beneath cylindrical lenses which extend vertically. The same cylindrical lenses could be used for all five devices. The image strips beneath the cylindrical lenses of the devices 30,32,34 are provided so as to give the effect of a moving image when the security device is tilted to the left or right as shown in FIG. 8. During this tilting process, the appearance of the devices 31,33 will also switch.

Figure 9:
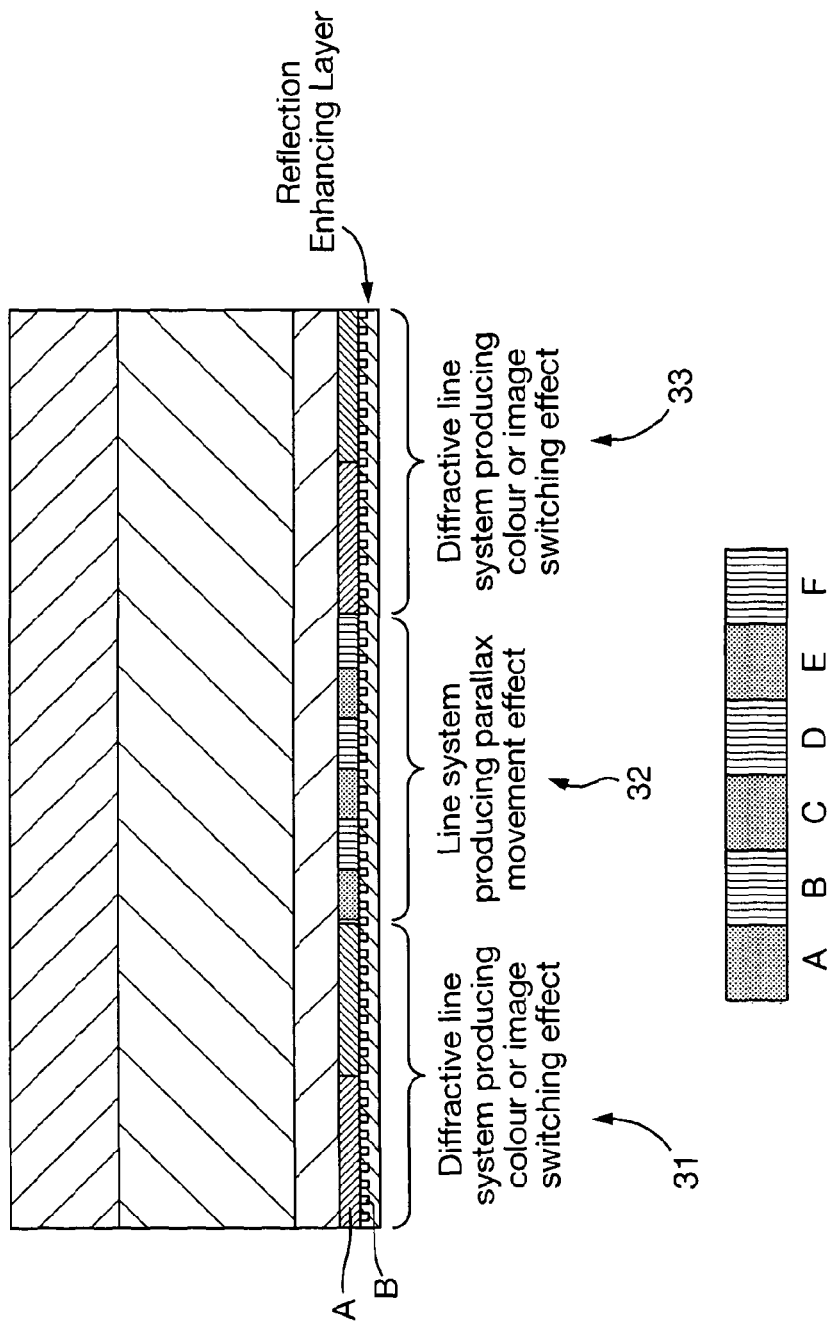
FIG. 9 is a schematic cross-section through part of the device shown in FIG. 8.

FIG. 9 is a cross-section through part of the device of FIG. 8. In this example the image elements in the strips are generated using diffractive relief structures. As can be seen in FIG. 9, the device comprises sets of cylindrical lenses 2 (as before) on a transparent substrate 4. Under each lens defining the devices 31,33, are provided two image strips A,B having the form shown in FIG. 5.

Under each lens corresponding to the devices 30,32,34, are provided a plurality (in this case six) of image strips A-F defining the movement effect of the chevron.

Figure 22:
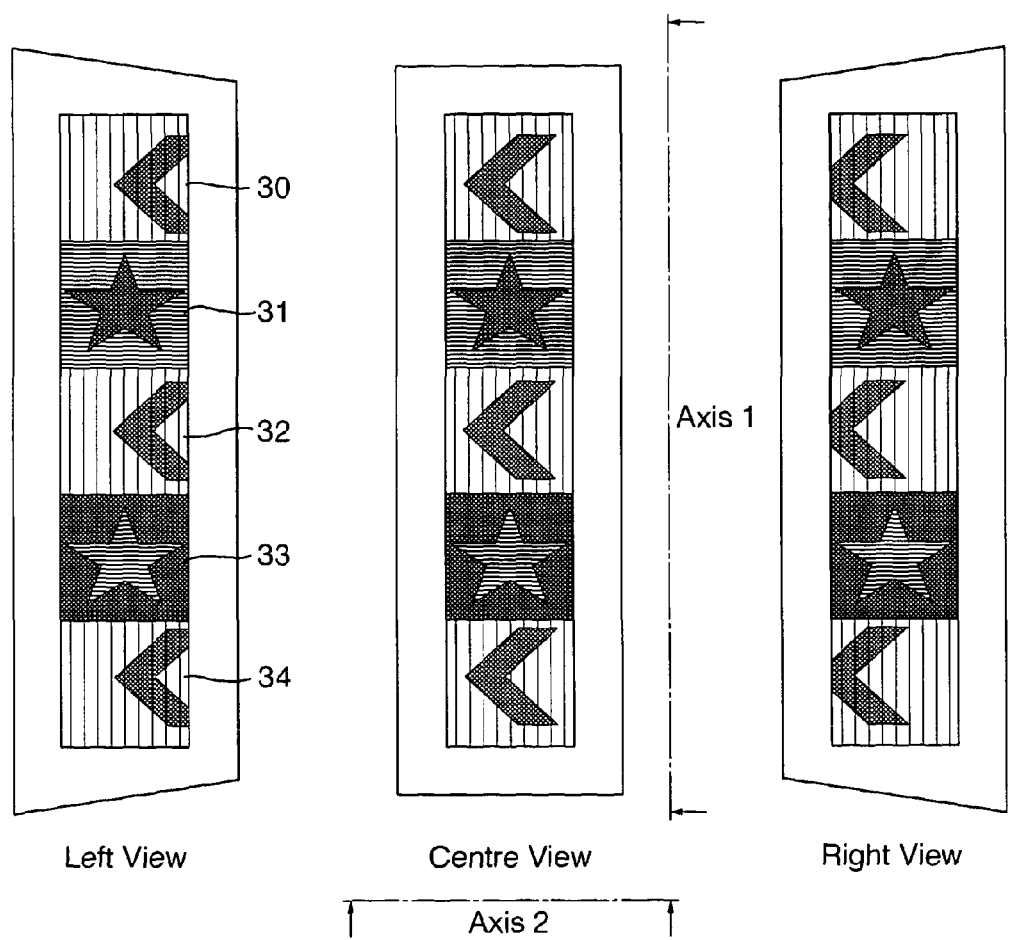

In an alternative example to that shown in FIGS. 8 and 9 the cylindrical lenses of the devices 31,33 and the cylindrical lenses of the devices 30,32,34 could extend in different directions for example the cylindrical lenses of the devices 31 and 33 could extend horizontally and the cylindrical lenses of the devices 30,32,34 could extend vertically. This is illustrated in FIGS. 22 and 23 When such a security device is tilted to the left or right, i.e. rotating around axis 1, the devices 30,32 and 34 will give the effect of a moving image but the appearance of the devices 31,33 will remain unchanged. In contrast, when the security device is tilted towards and away from the viewer, i.e. rotating around axis 2, the devices 31,33 will exhibit the colour switching effect described earlier but the appearance of the devices 30,32,34 will remain unchanged.

In either of the embodiments discussed above the image elements in strips A and B for devices 31 and 33 do not have to be formed by relief structures and could be formed by conventional printing techniques. This is also the case for devices 30, 32 and 34 but the use of relief structures is very much preferred in order to achieve the small strip widths necessary for a lenticular animation effect in a thin device.

Figure 10:
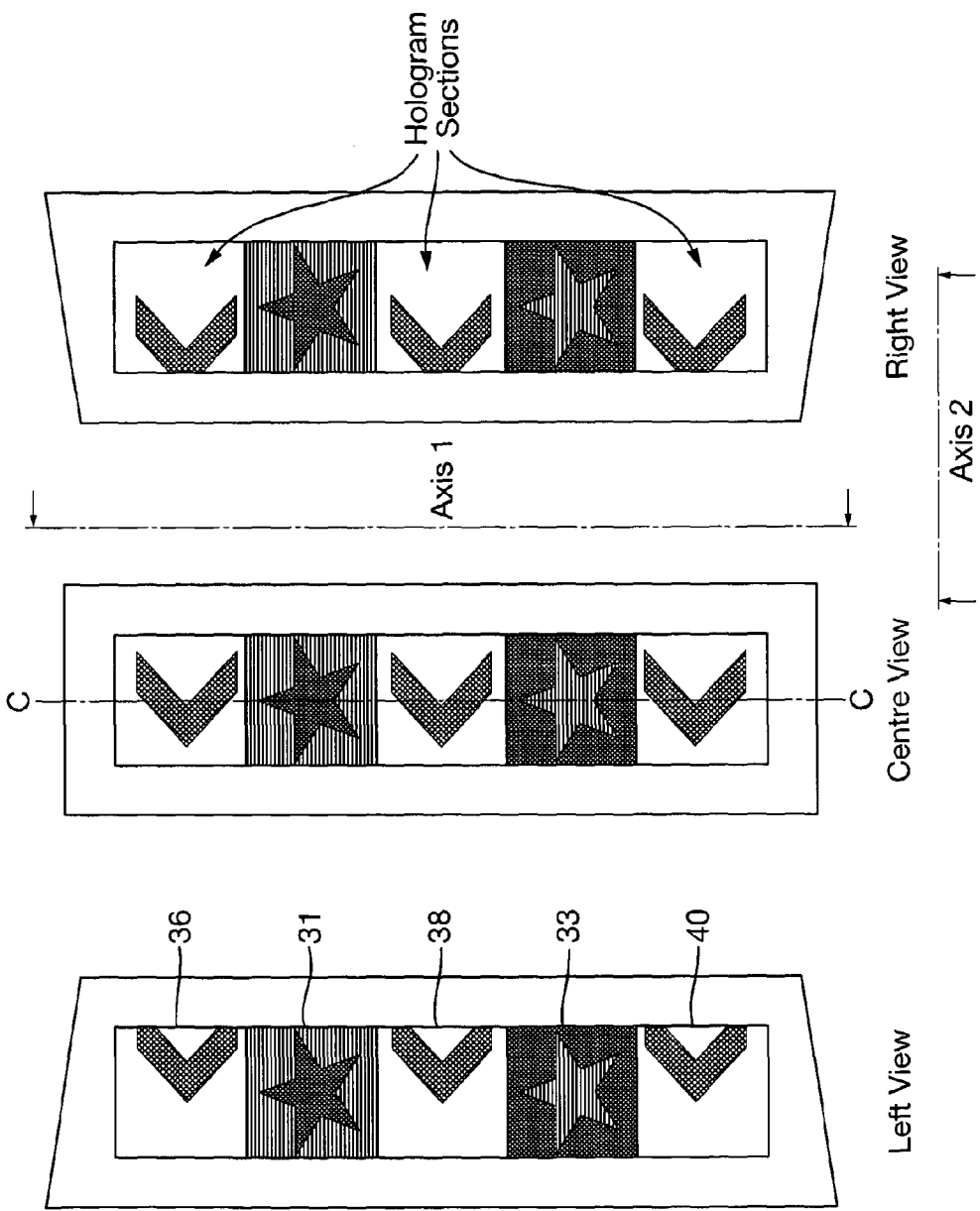
FIG. 10 illustrates another example of a security device incorporating holographic generating structures in combination with the lenticular devices.
Figure 11:
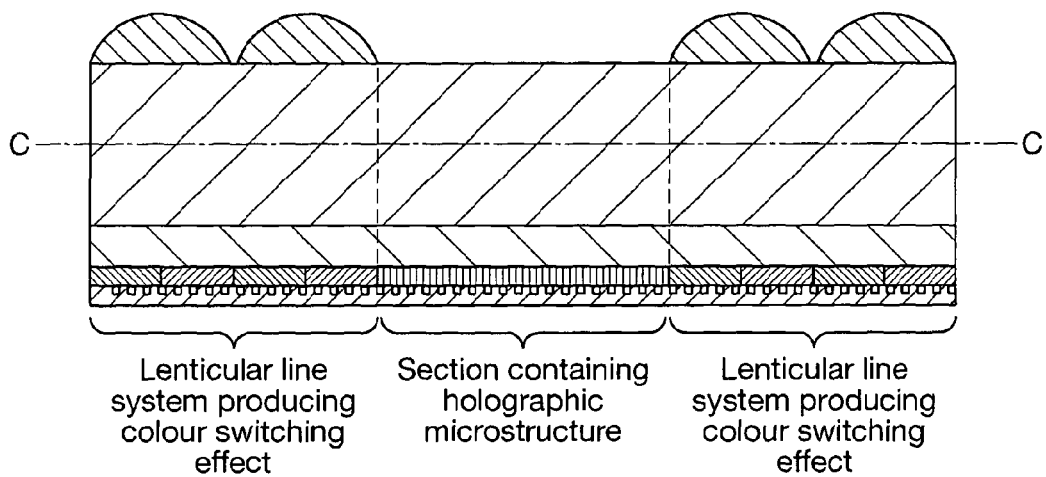
FIG. 11 is a schematic cross-section through part of the device shown in FIG. 10.

FIGS. 10 and 11 are similar to FIGS. 8 and 9 but illustrating another example. In this case, holographic generating structures 36,38,40 are interleaved around two lenticular devices 31,33 having the same form as the devices 31,33 shown in FIG. 8.

When this device, typically a security thread, is tilted to the left and right (rotating around axis 1), the holographic generating structures will generate the effect of a moving chevron image as can be seen in FIG. 10. The appearance of the lenticular devices 31,33 will remain unchanged.

When the device is tipped towards and away from the viewer (rotating around axis 2), however, the lenticular devices 31,33 will exhibit their colour switching effect but the holographic images will remain unchanged.

As can be seen in FIG. 11, the lenticular devices 31,33 are provided by sets of image strips A,B registered with the lenses 2 while the holographic microstructure 50 of each device 36,38,40 is located beneath part of the substrate 4 on which there are no lenses.

The holographic generating structures 36,38,40 can be in the form of holograms or DOVID image elements.

As explained above, the image strips A,B etc. have been printed onto the substrate or carrier layer 4. However, the image strips can also be formed as a relief structure and a variety of different relief structures suitable for this are shown in FIG. 12. Thus, FIG. 12A illustrates image regions of the strips (IM) in the form of embossed or recessed lines while the non-embossed lines correspond to the non-imaged regions of the strips (NI). FIG. 12B illustrates image regions of the strips (IM) in the form of debossed lines or bumps.

In another approach, the relief structures of the image regions (IM) can be in the form of diffraction gratings (FIG. 12C) or moth-eye/fine pitch gratings (FIG. 12D).

The image regions (IM) of FIGS. 12A and 12B can be further provided with gratings as shown in FIGS. 12E and 12F respectively.

FIG. 12G illustrates the use of a simple scattering structure in the image regions IM providing an achromatic effect.

Further, as explained above, in some cases the recesses of the image regions (IM) of FIG. 12A could be provided with an ink or the debossed regions or bumps of FIG. 126 could be provided with an ink. The latter is shown in FIG. 12H where ink layers 100 are provided on the bumps.

FIG. 12I illustrates the use of an Aztec structure on the image regions (IM).

Additionally, image and non-image areas or regions could be defined by combinations of different elements types, e.g. the image areas could be formed from moth-eye structures whilst the non-image areas could be formed from a grating. Or even the image and non-image areas could be formed by gratings of different pitch or orientation.

The height or depth of the bumps/recesses is preferably in the range 0.5-10 μm and more preferably in the range 1-5 μm. Typical widths of the bumps/recesses will be defined by the nature of the artwork but would typically be less than 100 μm, more preferably less than 50 μm and even more preferably less than 25 microns. The width of the image strip and therefore the width of the bumps or recesses will be dependent on the type of optical effect required for example if the diameter of the focussing elements is 30 μm then a simple switch effect between two views A and B could be achieved using 15 μm wide image strips. Alternatively for a smooth animation effect it is preferable to have as many views as possible typically at least three but ideally as many as 30, in this case the width of the image strips (and associated bumps or recesses) should be in the range 0.1-6 μm.

In other examples (not shown), one or more of the holographic generating structures could be replaced by moiré magnification structures which could be either 2-dimensional (2D) or 1-dimensional (1D) structures. 2D moiré magnification structures are described in more detail in EP-A-1695121 and WO-A-94/27254. A moiré magnification device is constructed through a combination of microlenses and microimages. In the simplest case of a small pitch mismatch between the lens arrays and image arrays, an array of magnified images of constant magnification is observed with motion resulting from the normal parallax of a lens. In a 1D moiré magnification structure the 2D spherical lens array used in a conventional 2D moiré magnification structure is replaced with a repeating arrangement of cylindrical lens-lets. The result of this is that the micro-image elements are subject to moiré magnification in one axis only which is the axis along which the lenses exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place.

Figure 24:
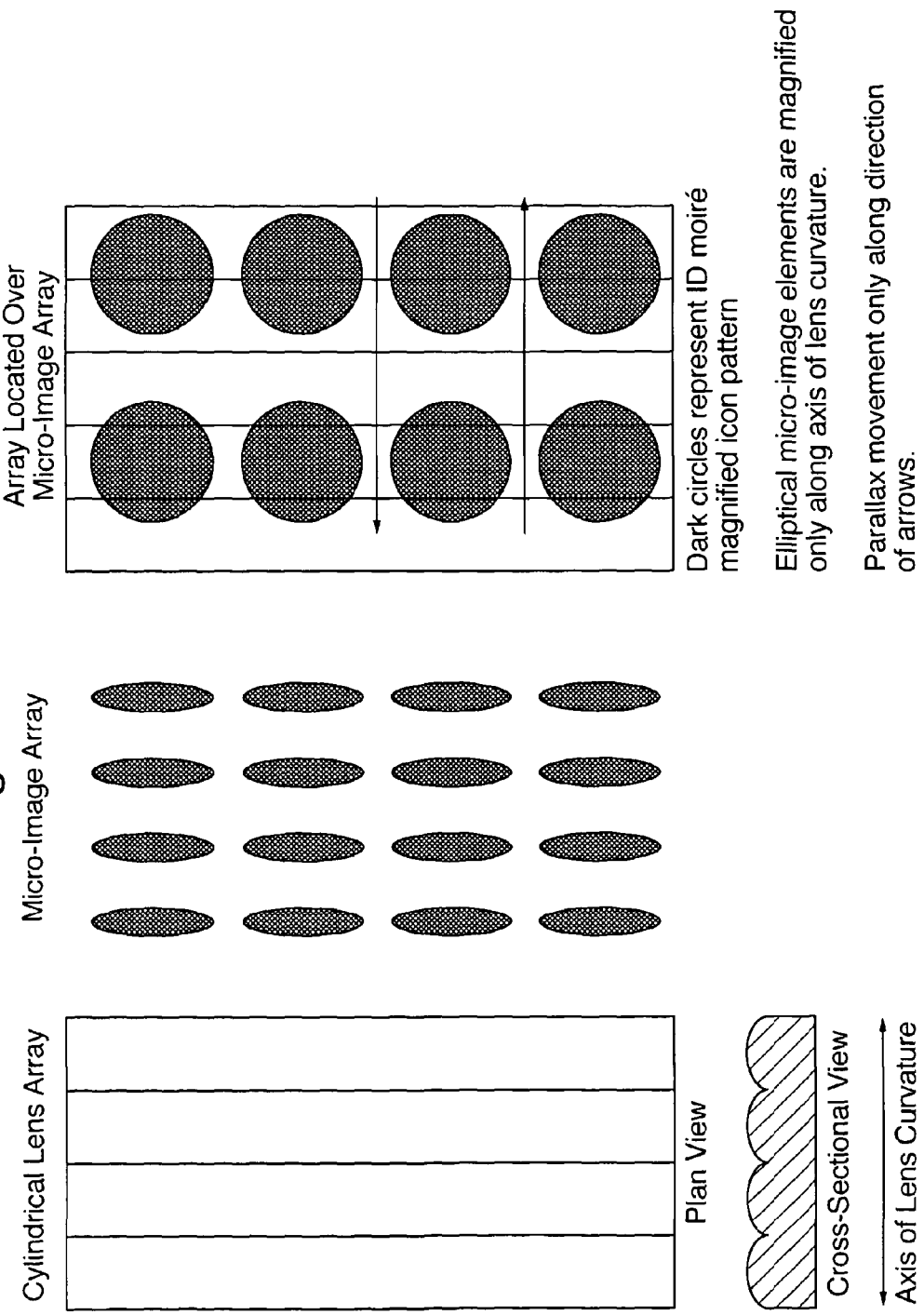
FIG. 24 illustrates the construction of a moiré magnification structure.

For example, and with reference to FIG. 24, consider a very simple scenario wherein we require the moiré magnified image to be comprised of an array of circles 2 mm in diameter. Further suppose we arrange the periodicity and alignment of the micro image array relative to the micro-lens array to provide a moiré magnification of ×50. If for convenience we choose the axis of lens curvature of the lenses to be the x-axis it then follows that the micro image array will be comprised of a matrix of elliptical image elements wherein the minor axis of the ellipse (coinciding with the x-axis) will have a width of 0.04 mm and a height of 2 mm.

It should be appreciated that in a 1-D moiré system parallactic motion occurs only along the axis in which the cylindrical lens-lets exhibit their periodic variations in curvature. Thus in the example just described, parallax motion of the circular images (as well as magnification) will occur along the x-axis on east-west tilting of the device. It should be noted that on north-south tilting of the device no parallax motion will be exhibited. Conversely if the cylindrical lens system and micro-image array are rotated by 90 degrees then parallax motion will take place along the y-axis on north south tilting of the device.

It is of course possible to arrange the microlens array and microimage array such that the axis of parallax lies at 45 degrees to the x or y-axis or any angle in between which may be deemed advantageous.

The combination of a 1D moire magnification device with a lenticular structure is particularly advantageous because they both comprise a lenticular lens array and therefore the same lens array can be used for both regions of the device. In a typical example combination of a lenticular structure with a 1D moire magnification structure the lenticular structure could exhibit a simple image switch and the 1D moiré magnifier will exhibit a parallax motion effect.

Some examples of methods for manufacturing the devices described above will now be described. In the first example (FIG. 13), a carrier layer 240 such as a PET layer is coated with a cast-cure or thermoforming resin 210 (step 1). This resin 210 is then (step 2) cast or embossed into a cylindrical lens array 200.

The other side of the carrier 240 is then coated with a cast-cure or thermoforming resin 260 (step 3) and recesses 50 corresponding to the image elements in strips A and B are formed by casting or embossing in the resin layer (step 4) in register with the lenses 200.

For example a roll of clear polymeric film 240 of PET or the like is coated on its first surface with a layer 210 of UV curable polymer. Suitable UV curable polymers include photopolymer NOA61 available from Norland Products, Inc. New Jersey, Xymara OVD primer from Ciba or UV9206 from Akzo-Nobel. The film is then brought into contact with a first embossing roller that contains the negative of a master structure for the microlens array 200. On contacting the embossing roller the microlens array structure 200 is replicated in the UV curable polymer layer 210. Once the structure is replicated, the UV curable polymer layer is cured by application of UV radiation and the coated film is then released from the embossing roller. A layer 260 of UV curable polymer such as NOA61 is then coated onto the opposite second surface of the film 240. The second surface of the film is then brought into contact with a second embossing roller that contains the negative of a master structure for the image elements of the image strips. On contacting the embossing roller the image structure is replicated in the UV curable polymer layer on the second surface of the clear polymeric film. Once the structure is replicated the UV curable polymer layer is cured by application of UV radiation and the coated film is then released from the embossing roller.

A uniform pigmented or dyed coating is applied to the embossed surface of the layer 260 using a first opaque colorant 52 such as pigmented version of the casting resins above or for example a gravure ink such as 60473G from Luminescence which will fill the recesses 50 and provide a coating over the entire layer 26 (step 4). The coating method is typically by gravure, litho or flexographic printing or by using an anilox roller.

In step 6, excess first colorant 52 is removed using a doctor blade process so as to leave the first colorant only in the recesses 50 which form the image elements within the strips.

In step 7, a second colorant 54 in the form of a pigmented or dyed coating such as pigmented version of the casting resins above or for example a gravure ink such as 60473G from Luminescence is coated over the resin layer 260 typically using a litho, flexographic or gravure process so that in the non-image regions of the strip the second colorant 54 will be visible through the lenses 200 while in of the image regions first colorant 52 will be visible. The observer will therefore see a coloured image against a differently coloured background.

FIG. 14 illustrates a modified form of the method. In this case, steps 1-4 are as previously described with reference to FIG. 13. However, in step 5A, a first colorant 52 is transferred onto the non-recessed linear regions of the layer 260 using an offset transfer method from an anilox roller or litho blanket, or by litho, flexographic or gravure printing.

Then, in step 6A, a second colorant 54 is uniformly coated onto the layer 260 so that it also fills the recesses 50 (step 6A). This can be carried out using a gravure or offset litho process, etc. In this case, the second colorant 50 will define the image elements and the first colorant 52 will define the non-image elements and therefore form the coloured background region.

FIG. 15 illustrates an alternative method in which the image strips are formed by diffractive surface reliefs.

In step 1, a carrier layer 240 is coated with cast-cure or thermoforming resin layer 260.

The device illustrated has Strips A and B, representing views A and B of a lenticular switching device, comprising image and non-image regions. In Strips A the image regions are defined by one grating structure X and in Strips B the image regions are defined by a second different grating structure Y. The grating structures X,Y which have been previously originated are then simultaneously formed by embossing into the exposed surfaces of the resin layer 260 (step 2). The use of two different grating structures for the image regions of A and B provides a visual contrast due to the different diffractive colour effects. This difference is not essential and the image regions could be defined by the same diffractive grating structure. The non-image regions could also be defined by a grating structure which is different to that of the image regions. The grating structures could differ for example by rotation and pitch.

A reflection coating layer 60 is then provided over the grating surface relief structure (step 3). This reflection coating can be a metallisation or a high refractive index layer. The use of high refractive index materials, typically inorganic, are well known in the art and described in U.S. Pat. No. 4856857. Typical examples of materials suitable for the high refractive index layer include zinc sulphide, titanium dioxide and zirconium dioxide. Replacing the vapour deposited metal reflection enhancing layer with a transparent hri layer is particularly beneficial when the security device of the current invention is applied over transparent regions (typically known as apertures or windows) of secure documents.

The other side of the carrier layer 240 is then coated with a cast-cure or thermoforming resin 210 (step 4) and then a set of cylindrical lenses 200 are embossed into the layer 21 (step 5) so as to be in register with the strips A and B.

In the examples described above, cylindrical lenses have been used as the lenticular focusing elements. It should be understood, however, that they could be replaced by micromirrors.

Figure 25:
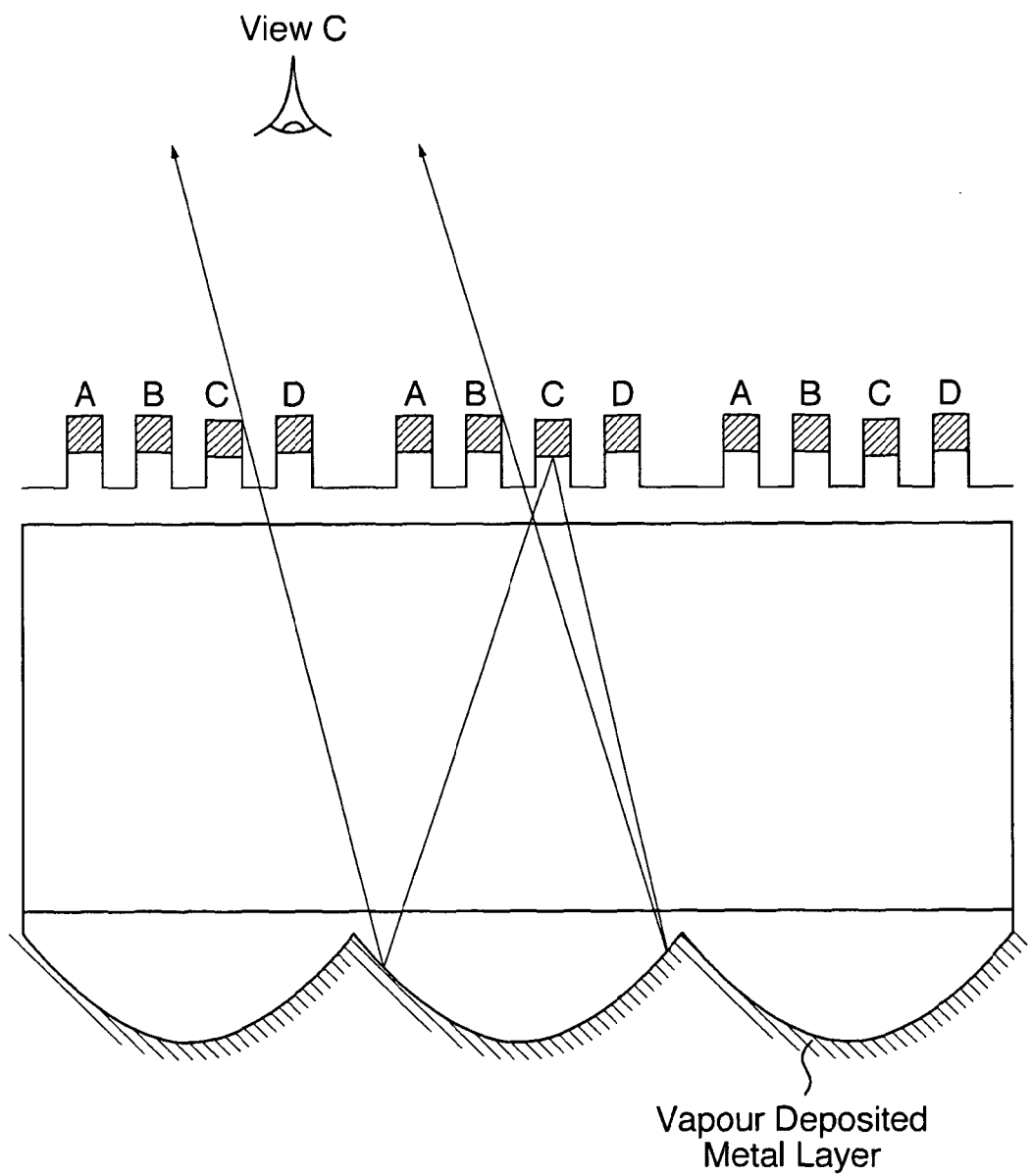
FIG. 25 illustrates a device utilizing micromirrors.

FIG. 25 illustrates a typical cross-section of the security device of the current invention which utilises micromirrors as the focussing elements. In this example a series of micromirrors 600 are formed in thermoforming resin 610 by casting a set of cylindrical lenses as described previously and then vapour depositing a layer of metal on the back surface. The lenticular device comprises four image strips A-D formed on the top surface of the device where the image regions of these strips are creating by printing on raised regions (bumps).

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

The security device of the current invention may also comprise additional security features such as any desired printed images, metallic layers which may be opaque, semi-transparent or screened. Such metallic layers may contain negative or positive indicia created by known demetallisation processes.

Additional optically variable materials can be included in the security device such as thin film interference elements, liquid crystal material and photonic crystal materials. Such materials may be in the form of filmic layers or as pigmented materials suitable for application by printing.

Figure 16A:
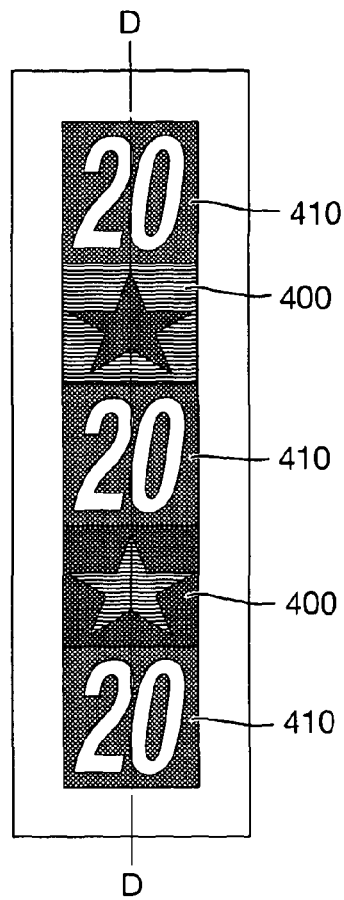
FIGS. 16a and 16b illustrate the appearance and schematic cross-section of a further security device according to the invention.
Figure 16B:
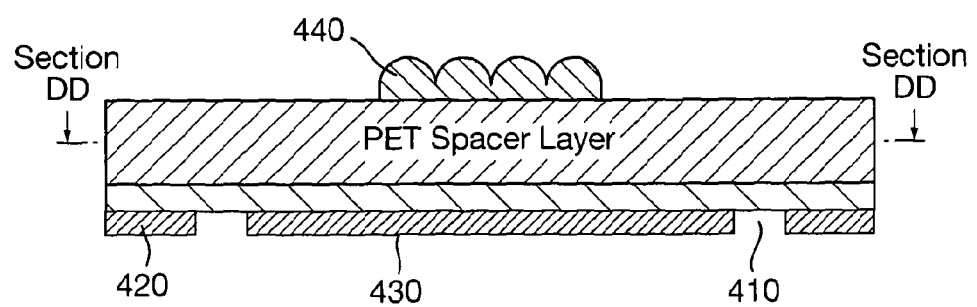

FIGS. 16a and b show a second security feature in the form of a demetallised image incorporated within a security device of the current invention. The security thread shown in FIG. 16a has regions 400 comprising complementary lenticular switching devices and regions 410 comprising demetallised indicia. A metallised layer 420 has been applied over the layer comprising the image forming relief structures 430 between a lenslet array 440. The metal layer 420 provides two benefits. Firstly it may improve the brightness and contrast of the image elements formed by the relief structures 430, this is particularly the case if diffractive relief structures are used to form the image elements. Secondly it allows the creation of demetallised indicia which can be viewed in reflective but more preferably transmitted light. In the example shown the demetallised indicia 410 are shown in a separate region of the device to the lenticular effect however in an alternative embodiment the two effects could be superimposed.

One way to produce partially metallised/demetallised films in which no metal is present in controlled and clearly defined areas is to selectively demetallise regions using a resist and etch technique such as is described in U.S. Pat. No. 4,652,015. Other techniques are known for achieving similar effects; for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO003054297.

In a further aspect of the current invention the contrast between the first and second images is achieved by leaving one of the image elements uncoated. With reference to FIG. 5 and considering first the image strip A1, in this example in the background region 12 the strip is black but in the symbol region 10 the strip will remain uncoated. In contrast, the image strip B1 is uncoated in the background region 12 and black in the symbol region 10. This lateral half-shift between the lines of the symbol and background means that a complementary switch from black to colourless will occur as the device is tilted in the manner shown in FIG. 4A. If the remaining layers of the device are substantially transparent then a complementary switch from black to transparent can be observed.

In a further example the black images described in the example above could be replaced with highly reflective material such as a metallic material and again the complementary image regions will remain uncoated such that with reference to FIG. 5 and considering first the image strip A1, in this example in the background region 12 the strip is metallic but in the symbol region 10 the strip will remain uncoated. In contrast, the image strip B1 is uncoated in the background region 12 and metallic in the symbol region 10. This lateral half-shift between the lines of the symbol and background means that a complementary switch from metallic to colourless will occur as the device is tilted in the manner shown in FIG. 17a. If the remaining layers of the device are substantially transparent then a complementary switch from metallic to transparent can be observed.

Figure 17B:
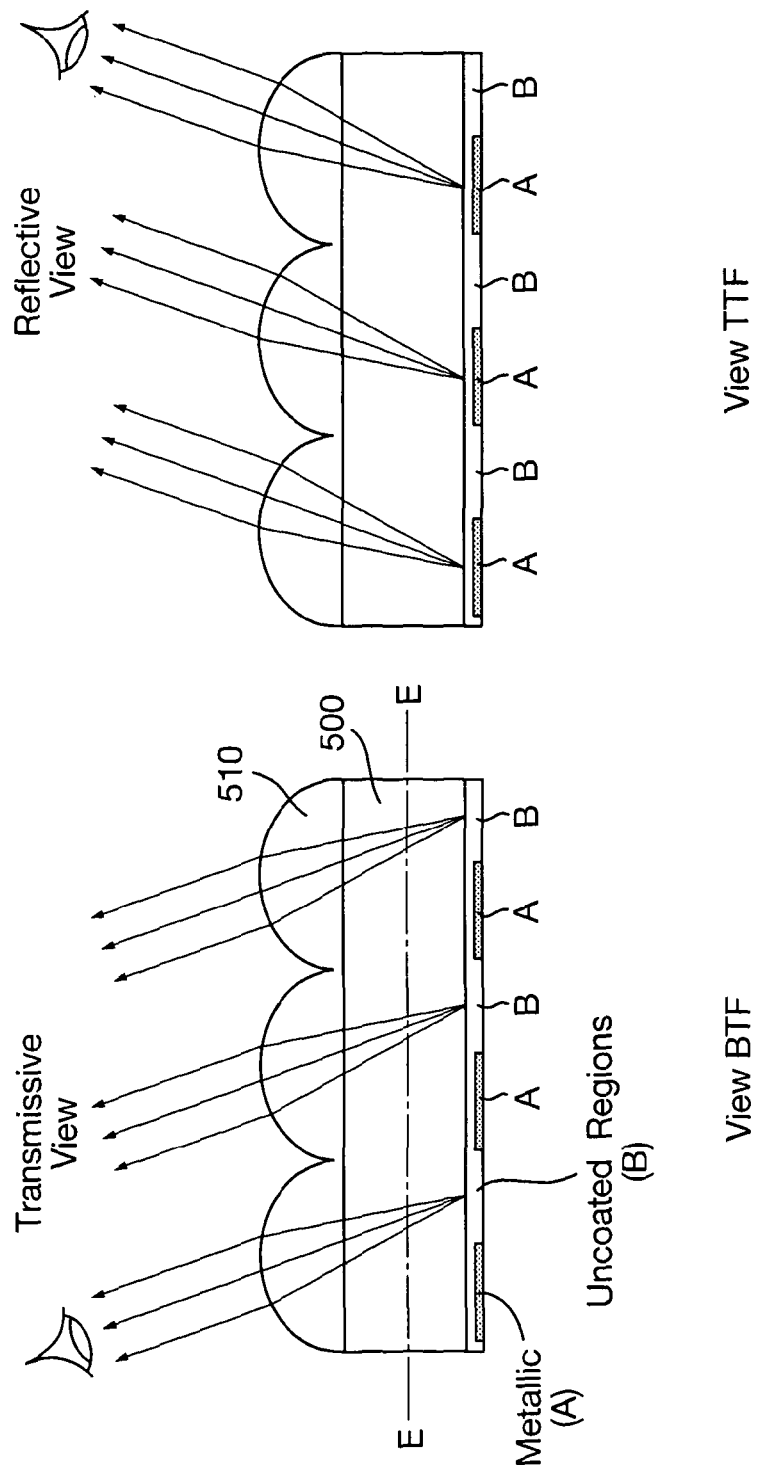

The use of highly reflective image elements as described with reference to FIG. 17a allows the creation of a device with regions which appear highly reflective at one angle of view and substantially transparent at a second angle. This is illustrated in the cross-section in FIG. 17b which shows a security device comprising a transparent polymeric carrier layer 500 onto one side of which is formed an array of microlenses 510 and on the opposite side is formed a set of strips A and B comprising metallised image elements and uncoated background non-image elements respectively. This is the case in the region of the star for the device shown in FIG. 17a, i.e. cross-section along line E-E. Note in the background region of FIG. 17a there will be a complementary set of strips A and B comprising uncoated image elements and metallised background non-image elements.

Considering now the region with the star when the device in FIG. 17a is tilted bottom edge forwards (BTF) the uncoated regions B are observed and the device appears transparent. When the device is tilted top edge forwards (TTF) the metallised regions A are observed and the device appears highly reflecting and metallic.

It has been observed that the switch from metallic to transparent is optimised if the width of the metallic (A) and uncoated (B) strips are not the same and preferably the ratio of the width of the metallic strips to the uncoated strips is in the range 25-35:75-65.

The metallic regions could be formed by the vapour deposition of a thin metallic layer through a mask or by forming the uncoated regions through a demetallisation process. Alternatively a metallised set of lines may be generated by using lenses to photo-ablate the metal. It is also possible that the metallic regions can be created using a printed metallic ink.

FIG. 18 shows an example of the demetallisation method. In step 1 recesses 520 are formed using a cast cure process in a resin layer 530. The recesses 520 correspond to the non-metallised regions in the final device. In step 2 the whole surface of the resin layer is coated with an aluminium layer 540 preferably by a vapour deposition process. In step 3 the non-recessed regions are coated with a layer of resist 560, this typically done using a lithographic or gravure printing process. In step 4 the structure is immersed in a metal etchant such as a concentrated sodium hydroxide solution and the aluminium in the regions not covered by resist is removed. The remaining resist 560 is then removed to leave a device comprising metallic and non-metallic regions.

Although FIG. 17a shows a device comprising an image or background region this is not essential and the device could simply comprise a uniform grid of metallic lines separated by uncoated transparent regions. Such a device would switch from uniformly transparent to metallic on tilting.

Such a metallic to transparent switching device could be applied over other indicia on a secure document such that at one angle of view, when the device appears metallic, the other indicia are concealed and at a second angle of view the device appears transparent and the underlying indicia is revealed.

The invention claimed is:

1. A security device having a lenticular device, comprising:
    a first image strip pair having a first and second image strip;
    a second image strip pair having a third and fourth image strip;
    a first portion of a first image in a first colour and a first portion of a second image in a second colour located in the first image strip;
    a second portion of the first image in the first colour and a second portion of the second image in the second colour located in the third image strip;
    a first portion of the first image in the second colour and a first portion of the second image in the first colour located in the second image strip;
    a second portion of the first image in the second colour and a second portion of the second image in the first colour located in the fourth image strip;
    a first lenticular focusing element located over the first image strip pair;
    a second lenticular focusing element located over the second image strip pair;
    wherein:
        the first and third image strips are different from each other;
        the second and fourth image strips are different from each other;
        in a first viewing direction, the first and third image strips are viewed by the first and second lenticular focusing elements, the first image is viewed in the first colour, and the second image is viewed in the second colour; and
        in a second viewing direction, the second and fourth image strips are viewed by the first and second lenticular focusing elements, the first image is viewed in the second colour, and the second image is viewed in the first colour.

2. The security device according to claim 1, further comprising an intermediate region extending between the first and second images, wherein in the intermediate region, each image strip has an intermediate section formed by areas of the first and second colours extending alongside one another.

3. The security device according to claim 2, wherein more than one intermediate section is formed in the intermediate region, at least two of the intermediate sections being arranged such that the arrangement of first and second colours is mutually complementary.

4. The security device according to claim 1, further comprising an intermediate region extending between the first and second images, wherein in the intermediate region, each image strip has an intermediate section, the colour of each intermediate section being the same.

5. The security device according to claim 1, further comprising a second lenticular device having the same construction as the first lenticular device except that the first and second colours are reversed in all of the image strips.

6. The security device according to claim 5, wherein the first and second lenticular devices are located adjacent one another.

7. The security device according to claim 1, wherein the second image comprises a background to the first image.

8. A security device having a lenticular device, comprising:
    a first strip pair having a first and. second strip;
    a second strip pair having a third and fourth strip;
    a first portion of an opaque version of a first image and a first portion of a transparent version of a second image located in the first strip;
    a second portion of the opaque version of the first image and a second portion of the transparent version of the second image located in the third strip;
    a first portion of a transparent version of the first image and a first portion of an opaque version of the second image located in the second strip;
    a second portion of the transparent version of the first image and a second portion of the opaque version of the second image located in the fourth strip;
    a first lenticular focusing element located over the first strip pair;
    a second lenticular focusing element located over the second strip pair;
    wherein:
        the first and third strips are different from each other;
        the second and fourth strips are different from each other;
        in a first viewing direction, the first and third strips are viewed by the first and second lenticular focusing elements, the first image is opaque, and the second image is transparent: and
        in a second viewing direction, the second and fourth strips are viewed by the first and second lenticular focusing elements, the first image is transparent, and the second image is opaque.

9. The security device according to claim 8, further comprising an intermediate region extending between the first and second images or background, wherein in the intermediate region, each strip has an intermediate section formed by opaque and transparent areas extending alongside one another.

10. The security device according to claim 9, wherein more than one intermediate section is formed in the intermediate region, at least two of the intermediate sections being arranged such that the arrangement of opaque and transparent areas is mutually complementary.

11. The security device according to claim 8, further comprising a second lenticular device having the same construction as the first lenticular device except that the opacity and transparency are reversed in all of the strips.

12. The security device according to claim 8, wherein the opaque portions are metallic.

13. The security device according to claim 1, wherein the image strips are registered to the lenticular focusing elements.

14. The security device according to claim 1, wherein image strips are defined by inks.

15. The security device according to claim 1, wherein the image strips are defined by a relief structure.

16. The security device according to claim 1, wherein the lenticular focusing elements comprise cylindrical lenses or micromirrors.

17. The security device according to claim 1, wherein the lenticular focusing element array has a periodicity in the range 5-200 microns.

18. The security device according to claim 1, wherein the image strips are provided in or on a substrate which is also provided with a holographic structure, separate from the lenticular device.

19. The security device according to claim 1, wherein the image strips are provided in or on a substrate which is also provided with microimages suitable for moiré magnification, the security device further comprising a moiré magnification lens array located over the microimages.

20. An article provided with the security device according claim 1.

21. The article according to claim 20, wherein the article is selected from banknotes, cheques, passports, identity cards, certificates of authenticity, fiscal stamps and other documents for security value or personal identity.

22. The article according to claim 21, wherein the article comprises a substrate with a transparent portion, on opposite sides of which the lenticular focusing elements and image strips respectively are provided.

23. A method of manufacturing a security device, the method comprising providing a first and second lenticular focusing element on one side of a transparent substrate; and providing a first and second pair of image strips on the other side of the transparent substrate, the image strips and lenticular focusing elements defining a lenticular device, comprising:
the first image strip pair having a first and second image strip;
the second image strip pair having a third and fourth image strip;
a first portion of a first image in a first colour and a first portion of a second image in a second colour located in the first image strip;
a second portion of the first image in the first colour and a second portion of the second image in the second colour located in the third image strip;
a first portion of the first image in the second colour and a first portion of the second image in the first colour located in the second image strip;
a second portion of the first image in the second colour and a second portion of the second image in the first colour located in the fourth image strip;
the first lenticular focusing element located over the first image strip pair;
the second lenticular focusing element located over the second image strip pair;
wherein:
the first and third image strips are different from each other;
the second and fourth image strips are different from each other;
in a first viewing direction, the first and third image strips are viewed by the first and second lenticular focusing elements, the first image is viewed in the first colour, and the second image is viewed in the second colour; and
in a second viewing direction, the second and fourth image strips are viewed by the first and second lenticular focusing elements, the first image is viewed in the second colour, and the second image is viewed in the first colour.

24. The method according to claim 23, further comprising an intermediate region extending between the first and second images, wherein in the intermediate region, each image strip has an intermediate section formed by areas of the first and second colours extending alongside one another.

25. The method according to claim 24, wherein more than one intermediate section is formed in the intermediate region, at least two of the intermediate sections being arranged such that the arrangement of first and second colours is mutually complementary.

26. The method according to claim 23, further comprising providing a second lenticular device having the same construction as the first lenticular device except that the first and second colours are reversed in all of the image strips.

27. The method according to claim 26, wherein the first and second lenticular devices are located adjacent one another.

28. The method according to claim 23, wherein the second image comprises a background to the first image.

29. A method of manufacturing a security device, the method comprising providing a first and second lenticular focusing element on one side of a transparent substrate; and providing a first and second pair of strips on the other side of the transparent substrate, the strips and lenticular focusing elements defining a lenticular device, comprising:
the first pair having a first and second strip;
the second strip pair having a third and fourth strip;
a first portion of an opaque version of a first image and a first portion of a transparent version of the second image located in the first strip;
a second portion of the opaque version of the first image and a second portion of the transparent version of the second image located in the third strip;
a first portion of a transparent version of the first image and a first portion of an opaque version of the second image located in the second strip;
a second portion of the transparent version of the first image and a second portion of the opaque version of the second image located in the fourth strip;
a first lenticular focusing element located over the first strip pair;
a second lenticular focusing element located over the second strip pair;
wherein:
the first and third strips are different from each other;
the second and fourth strips are different from each other;
in a first viewing direction, the first and third strips are viewed by the first and second lenticular focusing elements, the first image is opaque, and the second image is transparent; and
in a second viewing direction, the second and fourth strips are viewed by the first and second lenticular focusing elements, the first image is transparent, and the second image is opaque.

30. The method according to claim 29, further comprising an intermediate region extending between the first and second images or background, wherein in the intermediate region, each strip has an intermediate section formed by opaque and transparent areas extending alongside one another.

31. The method according to claim 30, wherein more than one intermediate section is formed in the intermediate region, at least two of the intermediate sections being arranged such that the arrangement of opaque and transparent areas is mutually complementary.

32. The method according to claim 29, further comprising providing a second lenticular device having the same construction as the first lenticular device except that the opacity and transparency are reversed in all of the strips.

33. The method according to claim 32, wherein the first and second lenticular devices are located adjacent one another.

34. The method according to claim 29, wherein the opaque portions are metallic.

35. The method according to claim 23, wherein the image strips are registered to the lenticular focusing elements.

36. The method according to claim 23, wherein the image strips are printed onto the substrate.

37. The method according to claim 23, wherein the image strips are defined by a relief structure embossed or cast-cured into a substrate.

38. The security device according to claim 8, wherein the first image comprises one of a symbol, character, or graphic device.

39. The security device according to claim 8, wherein the strips are registered to the lenticular focusing elements.

40. The security device according to claim 8, wherein the strips are defined by inks.

41. The security device according to claim 8, wherein the strips are defined by a relief structure.

42. The security device according to claim 8, wherein the lenticular focusing elements comprise cylindrical lenses or micromirrors.

43. The security device according to claim 8, wherein the lenticular focusing element array has a periodicity in the range 5-200 microns.

44. The security device according to claim 8, wherein the strips are provided in or on a substrate which is also provided with a holographic structure, separate from the lenticular device.

45. The security device according to claim 8, wherein the strips are provided in or on a substrate which is also provided with microimages suitable for moiré magnification, the security device further comprising a moiré magnification lens array located over the microimages.

46. An article provided with the security device according to claim 8.

47. The method according to claim 29, wherein the strips are registered to the lenticular focusing elements.

48. The method according to claim 29, wherein the strips are printed onto the substrate.

* * * * *